(12) United States Patent
Chen et al.

(10) Patent No.: US 11,132,422 B2
(45) Date of Patent: Sep. 28, 2021

(54) AUTOMATING SOLVING NP PROBLEMS IN ANNEALER SYSTEMS

(71) Applicant: FUJITSU LIMITED, Kawasaki (JP)

(72) Inventors: Wei-Peng Chen, Fremont, CA (US); Yoichi Koyanagi, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 16/447,656

(22) Filed: Jun. 20, 2019

(65) Prior Publication Data

US 2020/0401650 A1 Dec. 24, 2020

(51) Int. Cl.
*G06F 17/11* (2006.01)
*G06F 17/16* (2006.01)

(52) U.S. Cl.
CPC ............. *G06F 17/11* (2013.01); *G06F 17/16* (2013.01)

(58) Field of Classification Search
CPC ......... G06F 17/10; G06F 17/11; G06N 10/00; G06N 20/00
See application file for complete search history.

(56) References Cited

U.S. PATENT DOCUMENTS

| | | | |
|---|---|---|---|
| 7,664,720 B1 | 2/2010 | Branch | |
| 8,055,598 B1 | 11/2011 | Branch | |
| 9,122,387 B1 | 9/2015 | Branch | |
| 2011/0047201 A1 | 2/2011 | MacCready | |
| 2016/0034423 A1* | 2/2016 | Hastings | G06F 17/11 703/2 |
| 2017/0177544 A1* | 6/2017 | Zaribafiyan | G06F 17/10 |
| 2017/0255872 A1 | 9/2017 | Hamze | |
| 2017/0264373 A1* | 9/2017 | Krovi | G06N 10/00 |

OTHER PUBLICATIONS

Dr. Phil Goddard, "An Open Source SDK for Building Applications that Harness quantum Processors", 1QBit, D-Wave User conference, Sep. 2016 (23 pages).
Leap, "The first real-time quantum cloud service", URL<https://www.dwavesys.com/home> retrieved Jun. 19, 2019, (3 pages).
(Continued)

*Primary Examiner* — Michael D. Yaary
(74) *Attorney, Agent, or Firm* — Fujitsu Patent Center

(57) ABSTRACT

According to an aspect of an embodiment, operations may include displaying a electronic user interface that includes a plurality of user-selectable options corresponding to taxonomy information for a plurality of optimization problems. The operations may further include receiving a first user input selecting a first template for a specific optimization problem of the plurality of optimization problems. The first user input may include a selection of at least one user-selectable option of the plurality of user-selectable options. The operations may further include receiving a second user input via the selected first template for the specific optimization problem and providing a call to the optimization solver machine to generate a solution for the specific optimization problem based on the received second user input. The second user input may include input data for a plurality of parameters of the specific optimization problem, specified in the selected first template.

19 Claims, 12 Drawing Sheets

(56) References Cited

OTHER PUBLICATIONS

Fujitsu Global, What is Digital Annealer?, <http://www.fujitsu.com/global/digitalannealer/superiority/> retrieved Jun. 19, 2019 (7 pages).

Fujitsu Limited, Fujitsu Quantum-Inspired Computing Digital Annealer, <http://www.fujitsu.com/global/documents/digitalannealer/services/da-introduction.pdf> Feb. 22, 2019 (50 pages).

A. Lucas, "Ising Formulations of Many NP Problems," Frontiers in Physics, vol. 5, No. arXiv:1302.5843v3, p. 2, Jan. 24, 2014 (28 pages).

F. Glover, et al. A Tutorial on Formulating Using QUBO Models, CoRR abs/1811.11538 (2018) (55 pages).

Wikipedia, Simplex-algorithm <https://en.wikipedia.org/wiki/Simplex_algorithm> retrieved Jun. 19, 2019 (13 pages).

Wikipedia, Vehicle routing problem, <https://en.wikipedia.org/wiki/Vehicle_routing_problem> retrieved Jun. 19, 2019 (4 pages).

M. Conforti et al., Integer Programming, Graduate Texts in Mathematics 271, DOI 10.1007/978-3-319-11008-0 2 (2 pages).

Wikipedia, Clique problem, <https://en.wikipedia.org/wiki/Clique_problem> retrieved Jun. 19, 2019 (20 pages).

Wikipedia, Independent-set <https://en.wikipedia.org/wiki/Independent_set_(graph_theory)> retrieved Jun. 19, 2019 (7 pages).

1QBit Technology, <https://1qbit.com/technology/> retrieved Jun. 19, 2019 (5 pages).

P. Ronagh, el al., Solving Constrained Quadratic Binary Problems via Quantum Adiabatic Evolution, Quantum Information & Computation, vol. 16 Issue 11-12, Sep. 2016 (16 pages).

Extended European Search Report (EESR) with cf Form 1507, dated Sep. 16, 2020, mailed in connection with EP Application No. 20 165 556.0, 8 pages.

\* cited by examiner

US 11,132,422 B2

AUTOMATING SOLVING NP PROBLEMS IN ANNEALER SYSTEMS

FIELD

The embodiments discussed in the present disclosure are related to automating solving non-deterministic polynomial-time (NP) problems in annealer systems.

BACKGROUND

Many problems in real-world can be formulated by mathematical models, in particular as combinatorial problems. Majority of the combinatorial problems are under the category of Non-Deterministic Polynomial-time (NP) problems. Typically, these NP problems are computationally intractable by conventional computers. Typically, professional experts formulate optimization problems as NP problems, which may be further represented as combinatorial optimization problems. These professional experts then use optimization solvers, such as quantum annealing computers to get solutions for the formulated NP problems as solutions for the user-end problems. Nevertheless, the time for experts to manually formulate a problem is long and thus it takes even longer time for end-users (non-experts) to know the answers of their combinatorial problems. Moreover, the quality of formulations may depend on the experience of professionals. Inappropriate formulations may result in inferior solutions.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include displaying an electronic user interface that comprises a plurality of user-selectable options corresponding to taxonomy information for a plurality of optimization problems. The operations may further include receiving a first user input selecting a first template for a specific optimization problem of the plurality of optimization problems. The first user input may include a selection of at least one user-selectable option of the plurality of user-selectable options. The operations may further include receiving a second user input via the selected first template for the specific optimization problem. The second user input may include input data for a plurality of parameters of the specific optimization problem, specified in the selected first template. The operation may further include providing a call to an optimization solver machine to generate a solution for the specific optimization problem based on the received second user input.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
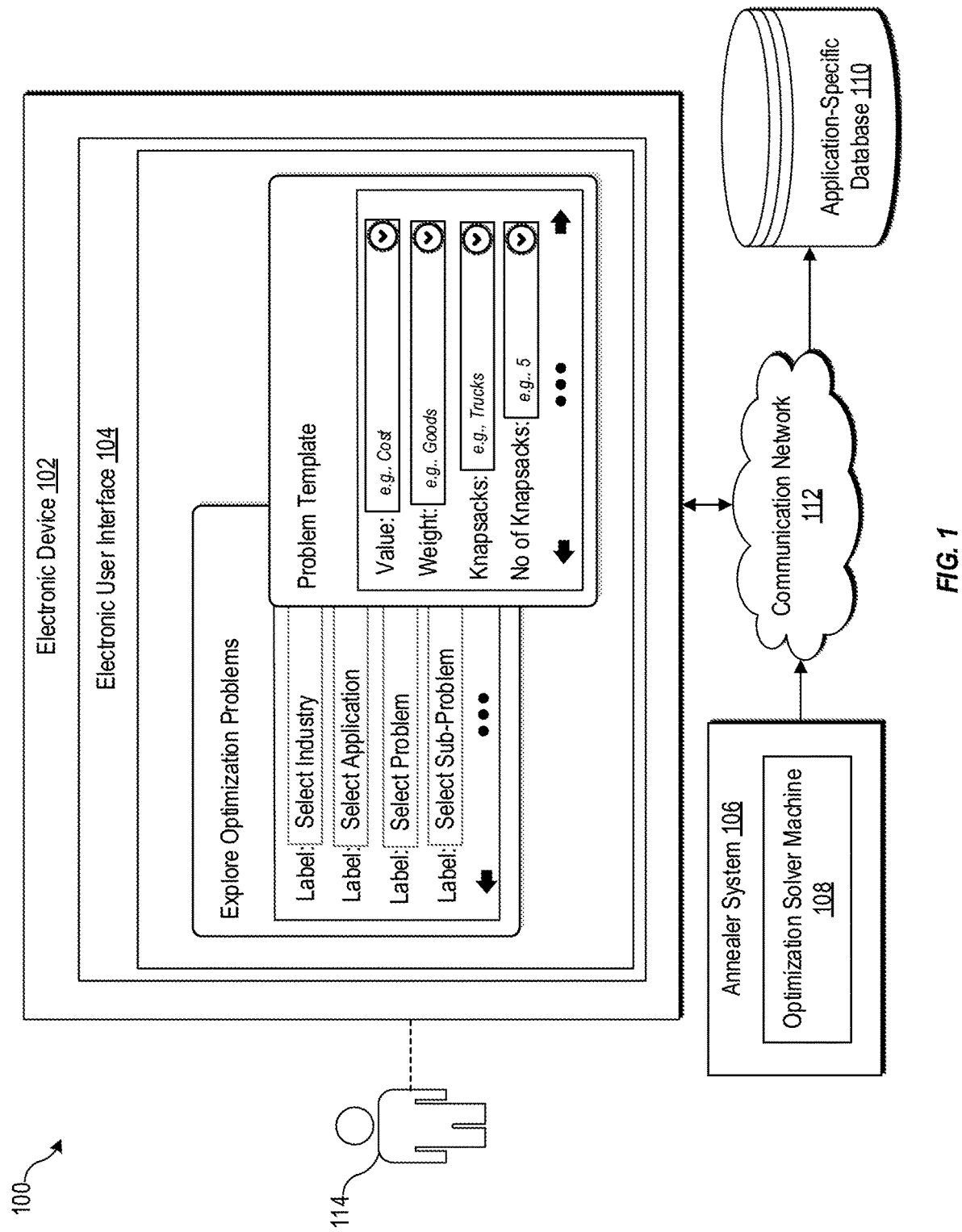
FIG. 1 is a diagram representing an example environment related to generating solutions for a specific optimization problems.

Some embodiments described in the present disclosure relate to methods and systems for automating solving of combinatorial optimization problems. Many of the real world problems can be treated as a combinatorial optimization problem. For example, a real world problem for finding best route for delivery of orders may be considered as a combinatorial optimization problem, in which it may be required to identify a shortest route between all the drop off/pickup points for the orders. Any particular combinatorial optimization problem will usually have a specific set of optimal solutions that have to be searched from a discrete solution space. The time and computational complexity for estimation of optimal solutions increases as the size of a combinatorial optimization problem increases. Most of the combinatorial optimization problems can be classified as a non-deterministic polynomial-time (NP) optimization problems, which are computationally intractable by conventional computers. Traditionally, optimal or near optimal solutions to NP optimization problems are obtained using sophisticated search methods or meta-heuristics, such as quantum annealing. In some cases, sophisticated optimization solver machines that are optimized to perform search on the solution space are used to obtain an optimal or near optimal solution for the NP optimization problems. Typically, these optimization solver machines require a specific input format for an input formulation of an NP optimization problem that is of interest to a user. For example, a quantum annealing device may require an input formulation, that is, a Quadratic Unconstrained Binary Optimization (QUBO) formulation.

Typically, an end-user has to specify details of a real world problem (e.g., container loading in logistics) to expert users who may analyze the specified details to first identify whether the real world problem is a combinatorial optimization problem and determine an NP formulation for the identified combinatorial optimization problem. The expert users use software solvers, quantum annealers, or digital annealers to obtain optimal or near optimal solutions for the combinatorial optimization problem. Nevertheless, the time for experts to manually formulate a problem is long and thus it takes long time for end-users (non-experts) to know the answers of their real world problem that modelled as a combinatorial optimization problem. These non-expert end-users are left with the only option to rely on the expert users to analyze and provide solutions for their real world problems. Further, the quality of NP formulations may depend on the experience of expert users. Inappropriate NP formulations may result in inferior solutions provided by optimization solver machines.

According to one or more embodiments of the present disclosure, the technological field of discrete optimization may be improved by configuring a system in a manner in which the system is able to provide an electronic user interface that enables an end-user to configure parameters related to a combinatorial optimization problem that is modelled on a real world problem. The system may be configured to receive user inputs via the electronic user interface, for selection of a template for a problem that matches closely with the problem of interest to the end-user. The system may be further configured to receive user inputs that includes input data for different parameters of the problem of interest, as specified on the selected template. The system may be further configured to generate a solution for the combinatorial optimization problem that is of interest to the end-user based on user inputs provided by the user.

In these or other embodiments, the system may include an oracle (i.e. a type of Turing machine) that may be configured to construct NP formulations for the combinatorial optimization problem. Each individual NP formulation may have parameters specified for the user-end problem mapped to an NP optimization problem. The construction of NP formulations may include a search over knowledge graphs that are pre-built for a set of NP optimization problems. The automated construction of NP formulation from user inputs removes a need for an expert user to manually analyze user inputs and construct NP formulation for problems that are of interest to the user. Also, as a knowledge graph exhaustively covers graph-based relationship among different NP problems, it is much easier for the system to identify best optimal NP formulation for a given combinatorial optimization problem, as compared to a manual analysis of an expert user. For example, an expert user may miss to consider a simplification of a cutting stock problem to a knapsack problem from given constraints.

In these or other embodiments, the system may be further configured to formulate objective functions and constraints (i.e. mathematical formulations) for the constructed NP formulations. The formulated objective functions and constraints may be also referred to as mathematical formulations for the NP optimization problems that is constructed based on user inputs. The system may be further configured to generate a solution for the combinatorial optimization problem that is of interest to the end-user by solving the formulated objective functions and constraints.

Embodiments of the present disclosure are explained with reference to the accompanying drawings.

FIG. 1 is a diagram representing an example environment related to generating solutions for a specific optimization problems, arranged in accordance with at least one embodiment described in the present disclosure. With reference to FIG. 1, there is shown an environment 100. The environment 100 may include an electronic device 102, an electronic user interface 104 displayed on the electronic device 102, an annealer system 106 which may include an optimization solver machine 108. The environment 100 may further include an application-specific database 110 and a communication network 112. The electronic device 102, the annealer system 106, and the application-specific database 110 may be communicatively coupled to each other, via the communication network 112.

There is further shown a user 114 associated with the electronic device 102. Examples of the electronic device 102 may include, but are not limited to, a mobile device, a desktop computer, a laptop, a computer work-station, a server, such as a cloud server, and a group of servers. In one or more embodiments, the electronic device 102 may include a user-end terminal device and a server communicatively coupled to the user-end terminal device. Examples of the user-end terminal device may include, but are not limited to, a mobile device, a desktop computer, a laptop, and a computer work-station.

The electronic device 102 may comprise suitable logic, circuitry, and interfaces that may be configured to display the electronic user interface 104, which may include a plurality of user-selectable options corresponding to taxonomy information of a plurality of optimization problems. Each optimization problem of the plurality of optimization problem may correspond to a combinatorial optimization problem. The combinatorial optimization problem may be a known combinatorial/mathematical problem that may be formulated as an objective function based on which feasible solutions for the combinatorial optimization problem may be searched from a discrete solution space.

The electronic user interface 104 may be displayed to allow the user 114 to explore and identify optimization problems of interest. The taxonomy information may include, but are not limited to, one or more of application-specific domains, domain-specific applications, sub-problems for the domain-specific applications, and non-deterministic polynomial-time (N P) problems. The taxonomy information may be presented as the plurality of user-selectable options, for example, drop-down lists, input text boxes, buttons, checkboxes with labels, and the like.

Each user-selectable option of the plurality of user-selectable options may be mapped to one or more of the application-specific domains, the domain-specific applications, the sub-problems, and the NP problems. The electronic device 102 may be configured to receive a first user input selecting a first template for a specific optimization problem of the plurality of optimization problems. The specific optimization problem may be a real world optimization problem that may be of interest to the user 114. As an example, a real world optimization problem for the user 114 may be to determine a shortest route for pickup/delivery of a set of goods between a set of pickup/drop points. As another example, a real world optimization problem for the user 114 may be to load different shipping containers with different types of goods such that profit per shipping container is maximum along with maximum capacity utilization of all the shipping containers. As another example, a real world optimization problem may be to schedule "100" flights leaving at different times from "10" or more airports, with each airport having at least "10" boarding/terminal gates such that no flight is left un-utilized. For this problem, there may be different constraints, such as crew/staff availability, occupancy of gates/terminals by other airlines, and weather conditions.

Further, the specific optimization problem may correspond to an NP problem of a plurality of NP problems. For example, the NP problem may be one of a graph coloring problem, a clique problem, an independent set problem, a clique cover problem, a minimax matching problem, a Knapsack problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, or a K-Plex problem.

The received first user input may include a selection of at least one user-selectable option of the plurality of user-selectable options. Hereinafter, "at least one user-selectable option" may be interchangeably referred to as "one or more user-selectable options". The electronic user interface 104 may enable a user, such as the user 114, to explore different user-selectable options of the plurality of user-selectable options and identify the first template for the specific optimization problem, which may be of interest to the user 114. As an example, the user 114 may select a specific combination of user-selectable options, such as "logistics" as an application-specific domain, "strategic planning" as a domain-specific application, "container loading" as a sub-problem, and "bin packing" as an NP problem. By selecting the specific combination of user-selectable options, the user 114 may select the first template for the specific optimization problem on the displayed electronic user interface 104. The selected first template may specify a plurality of parameters of the specific optimization problem. The plurality of parameters may include, but are not limited to, pre-defined variables, labels for the variables, values, constraints, objective function(s), and user-declarable variables.

The electronic device 102 may be further configured to receive a second user input via the selected first template for the specific optimization problem. The second user input may include input data for the plurality of parameters of the specific optimization problem, specified in the selected first template. The input data may include, but is not limited to, values for different parameters, constraints (e.g., at least two trucks), conditions (e.g., if-else conditions), and objective function(s). As an example, for a specific optimization problem in logistics industry that is related to a strategic planning for shipping product orders, the plurality of parameters may include, but are not limited to, a number of containers/trucks, a number of products to be shipped, a size/weight of each type of product to be shipped, and a shipping cost per product type. Also, for the specific optimization problem, the plurality of parameters may include a set of constraints, such as a time constraint, a cost constraint, or a weight constraint. The second user input may be used to specify values, constraints, conditions, and/or relationships (e.g., objective function(s)) among different parameters for the plurality of parameters of the specific optimization problem.

In one or more embodiments, the electronic device 102 may be configured to provide a call to the optimization solver machine 108 of the annealer system 106 to generate a solution for the specific optimization problem based on the second user input. In order to generate the solution, the specific optimization problem may have to be submitted in a suitable format to the annealer system 106. The suitable format may include an objective function that needs to be minimized or optimized to generate the solution for the specific optimization problem. In order to obtain the objective function, the electronic device 102 may be configured to construct at least one NP formulation for the specific optimization problem, based on the received second user input. Hereinafter, "at least one NP formulation" may be interchangeably referred to as "one or more NP formulations". Further, the electronic device 102 may be configured to formulate the objective function (also referred to as mathematical formulation/unconstrained mathematical formulation) for a plurality of attributes of the corresponding NP formulation constructed for the specific optimization problem. The details of construction of the one or more NP formulations and the objective function are provided, for example, in FIGS. 3, 5, 7, and 8.

In one or more embodiments, the annealer system 106 may be configured to receive the call to generate the solution for the specific optimization problem based on the second user input. The solution for the specific optimization problem may include value data for variables for which the specific optimization problem has to be solved. For example, the value data may be integer values, floating point values, or binary values, and the like. The solution may be optimal (or near optimal solutions) that may be generated by application of one or more searching methods and/or meta-heuristic methods on a discrete solution space for the specific optimization problem. As an exemplary example, the annealer system 106 may be configured to apply quantum annealing (i.e. a meta-heuristic method) to find a global minimum of an objective function over a discrete solution space for the specific optimization problem. The operation of the electronic device 102 and the annealer system 106 are described further in detail, for example, in FIGS. 2, 3, 5, 7, 8, 9, 10, and 11.

The annealer system 106 may be a computing system that may be configured to execute software instructions associated with one or more searching methods and/or meta-heuristic methods, such as quantum annealing. In an embodiment of the disclosure, the annealer system 106 may be implemented as a cloud server, where inputs to the cloud server may be received via an application programming interface (API) request from the electronic device 102. For example, the inputs may include the call to generate the solution for the specific optimization problem and an objective function for an NP problem corresponding to the specific optimization problem.

The annealer system 106 may include the optimization solver machine 108. The optimization solver machine 108 may be configured to generate the solution for the specific optimization problem by solving objective function(s), for example, unconstrained/constrained mathematical formulation(s) (e.g. Quadratic Unconstrained Binary Optimization (QUBO) function(s)) for NP problem(s) mapped to the specific optimization problem. These unconstrained/constrained mathematical formulations may be NP-hard problems in terms of computational complexity. Thus, in other words, the optimization solver machine 108 may be configured to search, from a discrete solution space, for feasible solutions for the NP-hard problems (mapped to the specific optimization problem), which may be computationally intractable by conventional computers.

In one or more embodiments of the disclosure, the optimization solver machine 108 may be a generalized quantum computing device. In this embodiment, the generalized quantum computing device may use specialized optimization solving software applications at an application layer to implement searching methods or meta-heuristic methods, such as simulated annealing or quantum annealing, on a combinatorial optimization problem, specified by the user 114.

The generalized quantum computing device may be different from a digital bit-based computing device, such as digital devices that are based on transistor-based digital circuits. The generalized quantum computing device may include one or more quantum gates that use quantum bits (hereinafter referred to as "qubits") to perform computations for different information processing applications, such as quantum annealing computations for solving combinatorial optimization problems. In general, a qubit can represent: "0", "1", or a superposition of both "0" and "1". In most cases, the generalized quantum computing device may need a carefully controlled cryogenic environment to function properly. The generalized quantum computing device may use certain properties found in quantum mechanical systems, such as quantum fluctuations, quantum superposition of its Eigen-states, quantum tunneling, and quantum entanglement. These properties may help the generalized quantum computing device to perform computations for solving certain mathematical problems (e.g. QUBO functions) which are computationally intractable by conventional computing devices. Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, and nuclear magnetic resonance quantum computer.

In some other embodiments, the optimization solver machine 108 may be a quantum annealing computer that may be specifically designed and hardware/software optimized to implement searching methods or meta-heuristic methods, such as simulated annealing or quantum annealing. Similar to the generalized quantum computing device, the quantum annealing computer may also use qubits and may require a carefully controlled cryogenic environment to function properly.

In some other embodiments, the optimization solver machine 108 may correspond to a digital quantum-computing processor for solving the specific optimization problem. More specifically, the optimization solver machine 108 may be a digital annealer that may be based on the semiconductor-based architecture. The digital annealer may be designed to model the functionality of the quantum annealing computer on a digital circuitry. The digital annealer may operate at room temperature and may not require cryogenic environment to function. Also, the digital annealer may have a specific form factor that may allow it to fit on a circuit board that is small enough to slide into the rack of a computing device or a computing system, such as a data center.

In some other embodiments, the optimization solver machine 108 may further include a processor that may be configured to execute software instructions associated with one or more searching methods and/or meta-heuristic methods, such as simulated annealing or quantum annealing. The processor may be a Reduced Instruction Set Computing (RISC) processor, an Application-Specific Integrated Circuit (ASIC) processor, a Complex Instruction Set Computing (CISC) processor, a Graphical Processing Unit (GPU), a Central Processing Unit (CPU), a co-processor, and/or a combination thereof.

In one or more embodiments, the electronic device 102 may be configured to receive a user request to connect the application-specific database 110 to the optimization solver machine 108 once the optimization problem is specified by the user 114, via the electronic user interface 104. The application-specific database may be a relational or a non-relational database that may include the input data for the plurality of parameters of the specific optimization problem. Also, in some cases, the application-specific database 110 may be stored on a server, such as a cloud server or may be cached and stored on the electronic device 102.

The electronic device 102 may be further configured to submit the user request to the optimization solver machine 108. The user request may include information associated with the application-specific database 110. The optimization solver machine 108 may be configured to connect with the application-specific database 110 based on the user request. Also, the user 114 may specify a set of user-specified conditions to be satisfied to trigger the optimization solver machine 108. The set of user-specified conditions may be used to trigger the optimization solver machine 108 to again generate a solution for the specific optimization problem. The set of user-specified conditions may include, but are not limited to, a manual trigger input from the user 114, a periodical/non-periodical change in values of one or more parameters of the specific optimization problem, and a logical condition among parameters of the specific optimization problem. In case at least one of the determined set of user-specified conditions is satisfied, the electronic device 102 may be configured to trigger the optimization solver machine 108 to retrieve the input data from the connected application-specific database 110 for solving the specific optimization problem.

It should be noted here that the communication between the electronic device 102, the annealer system 106, and a server that stores the application-specific database 110 may be performed via the communication network 112. The communication network 112 may include a communication medium through which the electronic device 102 may communicate with the annealer system 106, different servers, and external optimization solvers (not shown). Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In FIG. 1, the electronic device 102 and the application-specific database 110 are shown as separate from the annealer system 106. However, in certain exemplary embodiments, the entire functionality of the electronic device 102 and the application-specific database 110 may be incorporated in the annealer system 106, without deviating from the scope of the disclosure. In such a case, the communication network may be an interface (e.g., a Peripheral Component Interconnect (PCI) interface) within the annealer system 106.

Figure 2:
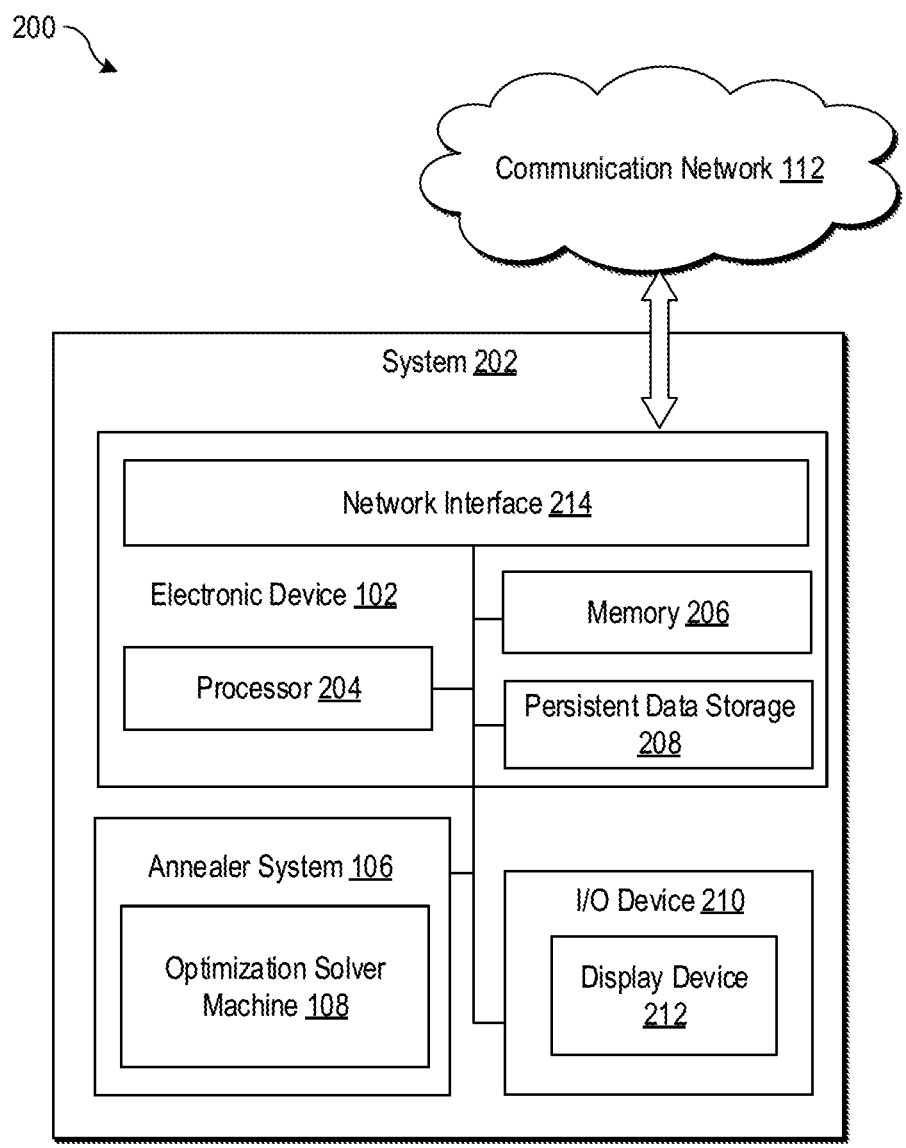
FIG. 2 is a block diagram of an example system for generating solutions for a specific optimization problem.

FIG. 2 is a block diagram of an example system for generating solutions for a specific optimization problem, arranged in accordance with at least one embodiment described in the present disclosure. FIG. 2 is explained in conjunction with elements from FIG. 1. With reference to FIG. 2, there is shown a block diagram 200 of an example system 202. The example system 202 may include the electronic device 102 and the annealer system 106. The electronic device 102 may include a processor 204, a memory 206, and a persistent data storage 208. The example system 202 may further include an input/output (I/O) device 210 which may include a display device 212. The electronic device 102 may further include a network interface 214.

The processor 204 may comprise suitable logic, circuitry, and/or interfaces that may be configured to execute program instructions associated with different operations to be executed by the electronic device 102. For example, some of the operations may include a display of the electronic user interface 104 on the display device 212, reception of multiple user inputs through different user-selectable options displayed onto the electronic user interface 104, and the like. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers.

In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, and/or interfaces that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, and/or interfaces that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The I/O device 210 may include suitable logic, circuitry, interfaces, and/or code that may be configured to receive a user input. The I/O device 210 may be further configured to provide an output in response to the user input. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (such as the display device 212) and a speaker.

The display device 212 may comprise suitable logic, circuitry, interfaces, and/or code that may be configured to render the electronic user interface 104 onto a display screen of the display device 212. In one or more embodiments, multiple user inputs from the user (such as the user 114) may be received directly, via the display device 212. In such cases, the display screen of the display device 212 may be a touch screen to receive the multiple user inputs. The display device 212 may be realized through several known technologies such as, but not limited to, a Liquid Crystal Display (LCD) display, a Light Emitting Diode (LED) display, a plasma display, and/or an Organic LED (OLED) display technology, and/or other display technologies. Additionally, in some embodiments, the display device 212 may refer to a display screen of smart-glass device, a 3D display, a see-through display, a projection-based display, an electrochromic display, and/or a transparent display.

The network interface 214 may comprise suitable logic, circuitry, interfaces, and/or code that may be configured to establish a communication between the electronic device 102, the annealer system 106, and the application-specific database 110, via the communication network 112. The network interface 214 may be implemented by use of various known technologies to support wired or wireless communication of the electronic device 102 via the communication network 112. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the example system 202 without departing from the scope of the present disclosure. For example, in some embodiments, the example system 202 may include any number of other components that may not be explicitly illustrated or described.

Figure 3:
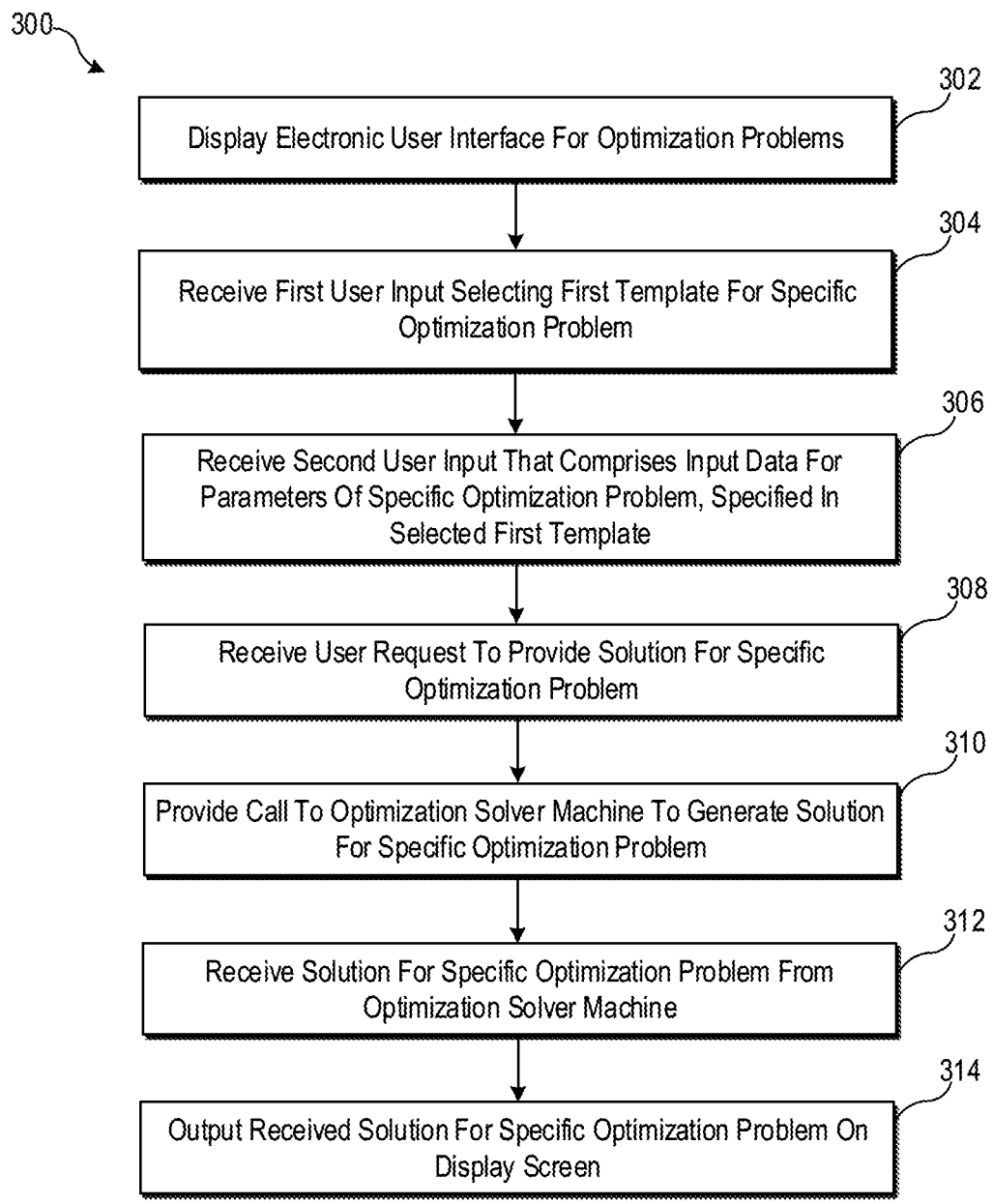
FIG. 3 is a flowchart of an example method of providing an electronic user interface for a user to compose a specific optimization problem to be solved by an optimization solver machine.

FIG. 3 is a flowchart of an example method of providing an electronic user interface for a user to compose a specific optimization problem to be solved by an optimization solver machine, according to at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the example system 202 of FIG. 2.

At 302, the electronic user interface 104 may be displayed. The electronic user interface 104 may include a plurality of user-selectable options corresponding to taxonomy information for a plurality of optimization problems. In one or more embodiments, the processor 204 may be configured to display the electronic user interface 104 that may include the plurality of user-selectable options corresponding to the taxonomy information for the plurality of optimization problems. An example of the electronic user interface 104 is provided in FIG. 4A and FIG. 4B. The taxonomy information may include one or more of the application-specific domains, the domain-specific applications, the sub-problems for the domain-specific applications, and the NP problems.

An example of taxonomy information is presented in Table 1, as follows:

TABLE 1

| Taxonomy Information | | | | |
| --- | --- | --- | --- | --- |
| Application-Specific Domain | Domain-Specific Application | Sub-Problem | Type Of Problem | NP-Problem |
| Transportation | Crew Scheduling | Crew Pairing | Assignment | Set Partitioning |
| Transportation | Crew Scheduling | Crew Pairing | Assignment | Set Covering |
| Transportation | Crew Scheduling | Crew Assignment | Assignment | Set Partitioning |
| Transportation | — | Airport Gate Assignment | Assignment | Quadratic Assignment |
| General | — | Allocation Of Facility To Location | Assignment | Quadratic Assignment |
| Manufacturing | — | Assign Tasks Of Jobs To Machines | Scheduling | Job Shop Scheduling |
| Manufacturing | — | Minimize Number Of Standard Sized Sheets In Meeting Orders | Allocation | Bin Packing |
| Manufacturing | Surface Mount Technology | Allocation Of Components To Placement Heads | Assignment | — |
| Manufacturing | Surface Mount Technology | Sequencing For Given Head | Routing | Travel Salesman |
| Manufacturing | Cattle Feeding Problem | Find Minimum Trucks To Cover All Feeding Areas | Routing | Vehicle Routing |
| — | — | — | Assignment | Max Network Flow |

TABLE 1-continued

Taxonomy Information

| Application-Specific Domain | Domain-Specific Application | Sub-Problem | Type Of Problem | NP-Problem |
|---|---|---|---|---|
| Public Sector | — | Capital Budgeting | — | Knapsack |
| Chemistry/Pharmaceutical | — | Finds Common Substructures | Graph Similarity | Co-S-Plex |
| Chemistry/Pharmaceutical | — | Remove DNA Sequences With Conflicts In Samples | — | Vertex Cover |
| Chemistry/Pharmaceutical | — | Rational Re-Design Of Known Drugs | — | Vertex Cover |
| Finance | — | Finding Optimal Arbitrage Opportunities | Routing | Minimum Hamiltonian Cycle |
| Finance | Portfolio Selection | Find Best Investment Combinations | Selection | S-Plex |
| Information Technology | Social Network Analysis | — | — | S-Plex |
| — | Process Execution | Optimize Task Execution On Multiprocessor System | Assignment | Bin Packing |
| Public Sector | — | School Bus Routing | Routing | Vehicle Routing |
| Public Sector | Garbage Collection | Find Routes That Cover All Arcs | Routing | Chinese Postman |
| Public Sector | Street Cleaning | Find Routes Cover All Arcs | Routing | Chinese Postman |
| Information Technology | Software Verification | — | — | Satisfiability |
| Logistics | System Design | Hub Location | Assignment | Quadratic Assignment |
| Logistics | Empty Container Management | Decide Source, Hub, and Destination Of Empty Containers | Allocation | Mixed Integer Linear Programming |
| Logistics | Strategic Planning | Decide Shipping Volume For Each Route and For Each Product | Allocation | Mixed Integer Linear Programming |
| Logistics | — | Container Loading | Selection | Bin Packing |
| Logistics | — | Vehicle Scheduling Problem | Assignment | Set Covering |
| General | Employees Scheduling | — | Scheduling | — |
| General | Task Assignment | Assign Conflicting Jobs To Different Slots To Minimize Makespan | Assignment | Coloring |

The electronic user interface 104 may be provided for the user 114 (expert or non-expert user) to explore and identify application-specific domains which match closely to the specific optimization problem. The electronic user interface 104 may be further provided for the user 114 to explore and identify the domain-specific applications/problems, sub-problems, or NP problems associated with the specific optimization problem. The plurality of user-selectable options may correspond to the taxonomy information for the plurality of optimization problems. In certain embodiments, the taxonomy information may be presented as a graph structure, where users may maneuver the graph structure to identify the first template which matches closest to the specific optimization problem that is of interest to the user 114.

In one or more embodiments, the plurality of user-selectable options may include a set of drop-down menu items. Each drop down menu item of the set of drop-down menu items may enlist one of application-specific domains, domain-specific applications/problems, sub-problems, or NP problems. The user 114 may be allowed to select one or more of application-specific domains, the domain-specific applications/problems, the sub-problems, or the NP problems to select the first template for the specific optimization problem.

In some other embodiments, the plurality of user-selectable options may further include a query interface to be displayed on the electronic user interface 104. The query interface may be displayed for the user 114 to provide a search query via a use natural language sentence(s), keyword(s), or short sentence(s) to identify which portion of the taxonomy information matches closely with the natural language sentence(s), keyword(s), or short sentences and maps to the specific optimization problem. In certain cases, the processor 204 may be configured to determine a similarity score between the portion of the taxonomy information and the search query. The similarity score may be used to decide whether a corresponding optimization problem exists for the provided search query. Also, in one or more embodiments, a summary of an entity, such as a problem statement, application example, and the like, may be displayed to user 114 via the electronic user interface 104. As an example, the entity and the summary may be displayed for one or more of the application-specific domains, the domain-specific applications, the sub-problems for the domain-specific applications, and the NP problems.

At 304, a first user input selecting a first template for the specific optimization problem of the plurality of optimization problems may be received. In one or more embodiments, the processor 204 may be configured to receive the first user input selecting the first template for the specific optimization problem of the plurality of optimization problems. The first user input may include a selection of one or more user-selectable options of the plurality of user-selectable options. In one or more embodiments, the received first user input may correspond to a selection of the first template from a plurality of templates for corresponding plurality of optimization problems. The operations performed to obtain the plurality of templates for the corresponding plurality of optimization problems are described, for example, in FIG. 5.

The user 114 may be allowed to specify the optimization problem via a top-down, step-by-step selection process which starts from a selection of the application-specific domain and ends with the selection of the problem/sub-problem/N P problem of interest to the user 114. It should be noted here that the user 114 may be allowed to jump to a specific user-selectable options on the electronic user interface 104. For example, in case the user 114 is interested in a specific NP problem, the electronic user interface 104 may allow the user 114 to directly access a corresponding user-selectable option for the N P problem.

At 306, a second user input may be received from the user 114 via the selected first template for the specific optimization problem. The second user input may include input data for the plurality of parameters of the specific optimization problem, specified in the selected first template. The plurality of parameters may include information associated with at least a set of application-specific constraints, a set of variables for the corresponding optimization problem, an objective function for the specific optimization problem, and the like. The first template may correspond to an application interface for the user 114 to further configure details, such as parameter values, for the specific optimization problem. The input data for the plurality of parameters may include, but is not limited to, application-specific constraint(s), variables name(s), parameter value(s), condition(s), and objective function(s) for the specific optimization problem. The input data may also include renamed/new labels for one or more parameters on the first template based on user preferences. For instance, a "truck" in the knapsack problem may be renamed as a "container". An example of the input data on a template for the knapsack problem is illustrated and described is FIG. 4B.

In the selected first template, the electronic user interface 104 may provide a plurality of input fields corresponding to the plurality of parameters of the specific optimization problem. The plurality of parameters may vary depending on the specific optimization problem. The first template may enable the user 114 to submit the second user input associated with the specific optimization problem. Once submitted, based on the second user input, a suitable objective function for the specific optimization problem may be formulated and submitted to the optimization solver machines 108. Alternatively, the suitable objective function for the specific optimization problem may be formulated and submitted to a plurality of optimization solver machines which may include the optimization solver machine 108 and/or other external optimization solver machines. The submission of the second user input via the selected first template may trigger a call to the optimization solver machine 108 and/or other external optimization solver machines to generate one or more solutions for the specific optimization problem. Each of the other external optimization solving machines may correspond to a type of optimization solver machine which uses software solvers, for example, such as a Gurobi solver or an open source software solver, such as Solving Constraint Integer Programs (SCIP) solver, Google OR-tool, GNU Linear Programming Kit (GLPK) solver. Also, these other external optimization solver machines may include hardware (e.g., generalized quantum computing device or quantum annealing computer) and/or software code that may be different from that of the optimization solver machine 108. This difference may further help to benchmark and improve the performance of the optimization solver machine 108.

Each input field for a corresponding parameter in the first template may be mapped to an attribute of a corresponding NP problem for the specific optimization problem. In some cases, the corresponding NP problem may further correspond to multiple optimization problems in multiple application-specific domains. Appropriate terminologies may be shown in the first template based on a context of the application-specific domain specified by the user 114. For example, in the knapsack problem, "knapsack" may refer to a "truck" in transportation domain or "capital budget" in the public sector domain. Although, the user 114 may be allowed to select the first template for the specific optimization problem, however, in some cases, the user 114 may modify or add the objective function or constraints in the first template. In one or more embodiments, the processor 204 may be configured to modify the corresponding NP problem for the specific optimization problem based on user inputs to modify or add the objective function or the constraints. For example, a 0-1 knapsack may be generalized as multiple knapsacks problem based on whether user inputs specify more than one knapsack. Alternatively, the same 0-1 knapsack problem may be generalized as a quadratic knapsack problem based on user inputs that specify that the value parameter for the knapsack problem depends on the inclusion of two items/objects.

In the selected first template, the plurality of input fields may further include common logical relations, which may be provided for the user 114 to configure constrain relationships among the plurality of parameters for the specific optimization problem. The constraint relationships may be specified based on logical operators or selection conditions. Examples of the logical operators may include, but are not limited to, "OR", "AND", "Exclusive-OR", "Not", "Either . . . OR", "if . . . then", "if and only if", "only if", and "neither . . . nor". Examples of the selection conditions may include, but are not limited to, "select at least k items", "select exact k items", and "select at most k items".

In one or more embodiments, upon a user request, the processor 204 may be configured to connect the application-specific database 110 to the optimization solver machine 108, via a connection interface. The application-specific database 110 may include the input data mapped to the plurality of parameters for the specific optimization problem. In some cases, the user request may be provided to other external optimization so ver machines to connect with the application-specific database 110. Also, the user request may include a set the conditions which when satisfied would trigger the optimization solver machine 108 or other external optimization solver machines to automatically retrieve the input data for the specific optimization problem from the application-specific database 110. The optimization solver machine 108 or other external optimization solver machines may be configured to generate the one or more solutions for the specific optimization problem based on the input data retrieved for the specific optimization problem from the application-specific database 110.

At 308, a user request may be received to provide a solution for the specific optimization problem. In one or more embodiments, the processor 204 may be configured to receive the user request to provide the one or more solutions for the specific optimization problem. The user request may be received in response to a user submission of the second user input. The user request may include at least the input data for the plurality of parameters of the specific optimization problem.

In one or more embodiments, once the user request is received, one or more operations associated with construction of one or more NP formulations for the specific optimization problem may be executed based on the received second user input. Further, one or more operations associated with the formulation of one or more objective functions (also referred to as mathematical formulations) may be executed based on the one or more NP formulations for the specific optimization problem.

In certain embodiments, the processor 204 may be configured to execute the one or more operations associated with construction of the one or more NP formulations for the specific optimization problem based on the received second user input. Also, the processor 204 may be further configured to execute the one or more operations associated with the formulation of the one or more objective functions based on the one or more NP formulations for the specific optimization problem. The one or more operations associated with construction of the one or more NP formulations and/or the formulation of the one or more objective functions are described in detail, for example, in FIGS. 7, 8, 9, 10, and 11.

At 310, a call may be provided to the optimization solver machine 108 to generate the solution for the specific optimization problem. The call may be provided in response to the received user request, i.e. based on a submission of second user input, via the selected first template. Alternatively, the call may be provided to a plurality of optimization solver machines that includes the optimization solver machine 108 and other external optimization solver machines. The aspect of providing the call to the plurality of optimization solver machines is described, for example, in FIG. 10. In one or more embodiments, the processor 204 may be configured to submit the received user request to the annealer system 106. In one or more embodiments, the processor 204 may be configured to provide the call to the optimization solver machine 108 to generate the solution for the specific optimization problem. In such cases, the processor 204 may be configured to provide one or more objective functions in specified format (e.g., Algebraic Modelling Language (AML) format) to the optimization solver machine 108 and/or other external optimization solver machines, via the communication network 112.

At 312, the solution may be received for the specific optimization problem from the optimization solver machine 108. In one or more embodiments, the processor 204 may be configured to receive the solution for the specific optimization problem from the optimization solver machine 108. The solution may include values, such as integer values, floating point values, or binary values for the attributes of the one or more objective functions. Such values be may either indicative of a presence of feasible (or optimal) solutions or represent the one or more solutions for the specific optimization problem.

At 314, the received solution for the specific optimization problem may be outputted on the display screen of the display device 212. Alternatively, the received solution for the specific optimization problem may be updated in the application-specific database 110, directly via the connection interface. In one or more embodiments, the processor 204 may be configured to output the received solution for the specific optimization problem on the display screen of the display device 212. Alternatively, the processor 204 may be configured update the received one or more solutions for the specific optimization problem in the application-specific database 110, directly via the connection interface. The Control may pass to end. Although the flowchart 300 is illustrated as discrete operations, such as 302, 304, 306, 308, 310, 312, and 314. However, in certain embodiments, such discrete operations may be further divided into additional operations, combined into fewer operations, or eliminated, depending on the particular implementation without detracting from the essence of the disclosed embodiments.

Figure 4A:
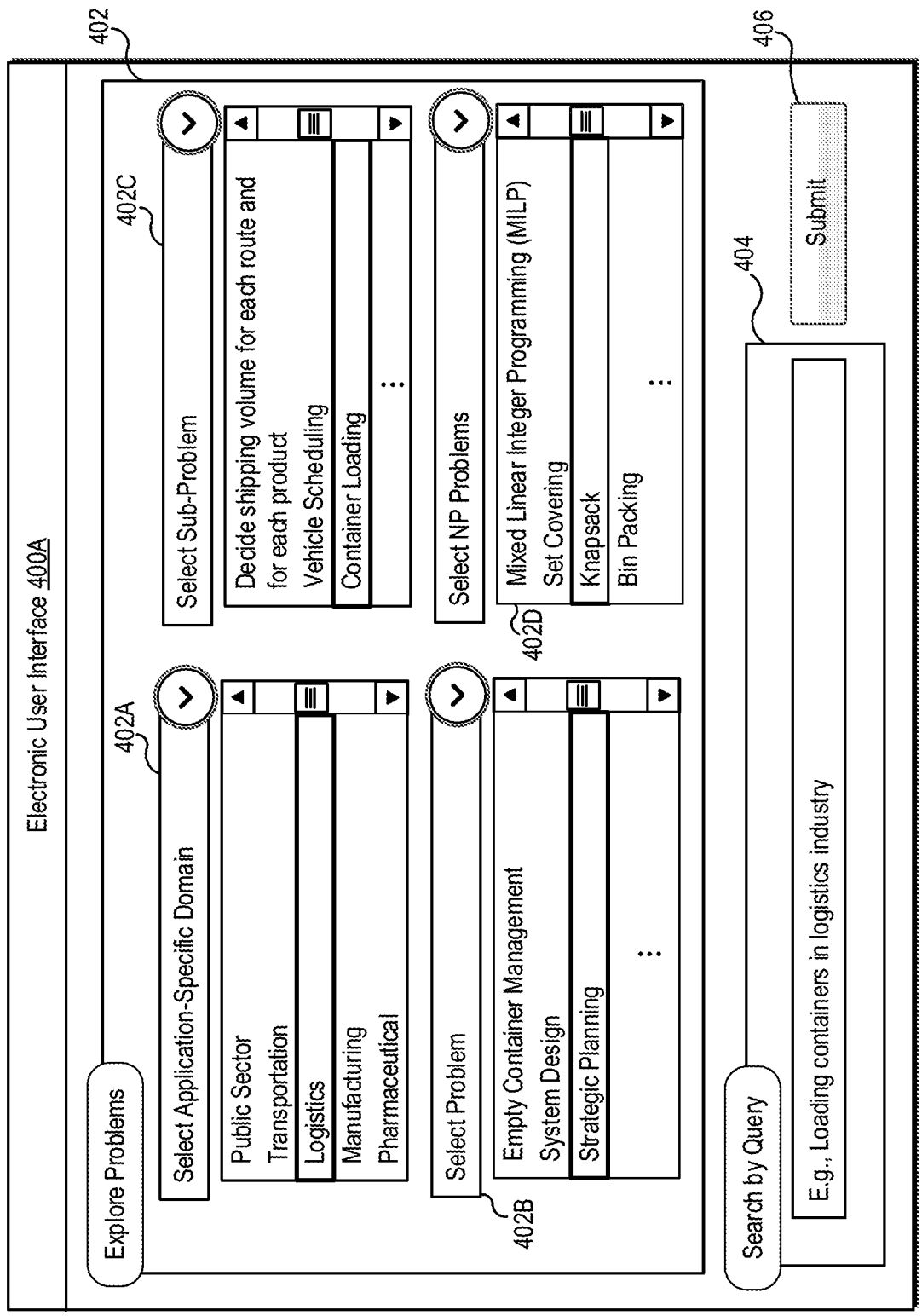
FIG. 4A illustrates an example electronic user interface for a user to explore and select a template for an example optimization problem.

FIG. 4A illustrates an example electronic user interface for a user to explore and select a template for an example optimization problem, according to at least one embodiment described in the present disclosure. FIG. 4A is explained in conjunction with elements from FIG. 1, FIG. 2, and FIG. 3. With reference to FIG. 4A, there is shown an example electronic user interface 400A that may correspond to the electronic user interface 104 of FIG. 1. In the example electronic user interface 400A, there is shown a set of user interface elements (hereinafter, referred to as "a set of UI elements"). The set of UI elements may include a first UI element 402, a second UI element 404, and a third UI element 406.

In FIG. 4A, the first UI element 402 is labelled as, for example, "Explore Problems". The first UI element 402 may include a plurality of user-selectable options, including but not limited to an application-specific domain selection option 402A, a problem selection option 402B, a subproblem selection option 402C, and an NP problem selection option 402D. The plurality of user-selectable options may correspond to taxonomy information for a plurality of optimization problems. Here, the taxonomy information may include, but is not limited to, one or more of application-specific domains, domain-specific applications, sub-problems for the domain-specific applications, and NP problems. A portion of the taxonomy information is provided as a table in FIG. 3, as an example.

In one or more embodiments, the processor 204 may be configured to display the example electronic user interface 400A that may include the plurality of user-selectable options corresponding to the taxonomy information for the plurality of optimization problems. The example electronic user interface 400A may be displayed based on a user request, which may be received via an application interface displayed onto the display screen of the display device 212. The application interface may be part of an application software. The application software may be, for example, one or more of a cloud server-based application, a web-based application, an OS-based application/application suite, an enterprise application, a mobile application, and the like. Each of the application-specific domain selection option 402A, the problem selection option 402B, the sub-problem selection option 402C, and the NP problem selection option 402D may enable the user 114 to explore and identify a template (also referred to as the first template) for the specific optimization problem that is of interest to the user.

The processor 204 may be configured to receive a first user input selecting the first template for the specific optimization problem of the plurality of optimization problems. The first user input may include a selection of one or more user-selectable options of the plurality of user-selectable options. In one or more embodiments, the received first user input may further correspond to a selection of the first template of a plurality of templates for corresponding plurality of optimization problems.

As shown, the application-specific domain selection option 402A may provide a set of input fields corresponding to a pre-specified set of application-specific domains, including but not limited to, public sector, logistics, manufacturing, and pharmaceutical. In case the user 114 selects an input field, such as logistics from the set of input fields, other user-selectable options, such as the problem selection option 402B may be configured to provide another set of input fields corresponding to the selected application-specific domain. For logistics as the selected application-specific domain, a pre-specified set of problems may be shown, including but not limited to, empty container management, system design, and strategic planning.

In case the user 114 selects a problem, such as strategic planning from the pre-specified set of problems, the sub-problem selection option 402C may provide another set of input fields for the selected problem. The sub-problem selection option 402C may provide another set of input fields corresponding to a pre-specified set of sub-problems. The pre-specified set of sub-problems may include, but are not limited to, a sub-problem to decide shipping volume for each route and each product, vehicle scheduling, and container loading. In case the user 114 selects a sub-problem, such as container loading from the pre-specified set of sub-problems, a template (also referred to as the first template) may be identified and displayed onto the example electronic user interface 400. Alternatively, in one or more embodiments, the NP problem selection option 402D may be updated to display another set of input fields for the selected sub-problem. The NP problem selection option 402D may provide another set of input fields corresponding to a pre-specified set of NP problems. For container loading as the sub-problem, the pre-specified set of NP problems may include, but are not limited to, Mixed Linear Integer Programming (MILP), Knapsack, and bin packing.

It should be noted here that the user 114 may provide the first user input over any user-selectable option or any combination of user-selectable option(s) of the plurality of user-selectable options. As an example, depending on the experience/skill set of the user 114, the user 114 may either provide the first user input over each of the plurality of user-selectable options or directly over the NP problem selection option 402D. Shown as an example, in case the user 114 is an expert or professional who understands combinatorial optimization or NP optimization, the user 114 may select Knapsack from the pre-specified set of NP problems.

As further shown, the second UI element 404 is labelled as, for example, "Search by Query". The second UI element 404 may correspond to a search interface that allows the user 114 to specify a query in natural language. Shown as an example, the user 114 may specify "loading containers in logistics industry" as the first user input via the second UI element 404. As another example, the user 114 may specify "strategic planning for container loading in logistics industry" as the first user input via the second UI element 404. In one or more embodiments, the processor 204 may be configured to map terms specified in the query (as the first user input) to information/details associated with the taxonomy information. Accordingly, in such cases, the processor 204 may be configured to identify a template (also referred to as the first template) for the specific optimization problem based on the mapping of the terms specified in the query to the information/details associated with the taxonomy information.

As further shown, the third UI element 406 is labelled as, for example, "submit". The third UI element 406 may correspond to an option, when selected, submits the selections provided via the first UI element 402 and/or the inputs into the second UI element 404, as the first user input to the electronic device 102.

It should be noted here that the electronic user interface 400A is merely explained and illustrated as an example and should not be construed as limiting for the present disclosure. Other modifications, additions, or omissions may be made to the electronic user interface 400A without departing from the scope of the present disclosure. It should be further noted that the electronic user interface 400A may also include other UI elements, which have been omitted from the present disclosure for the sake of brevity.

Figure 4B:
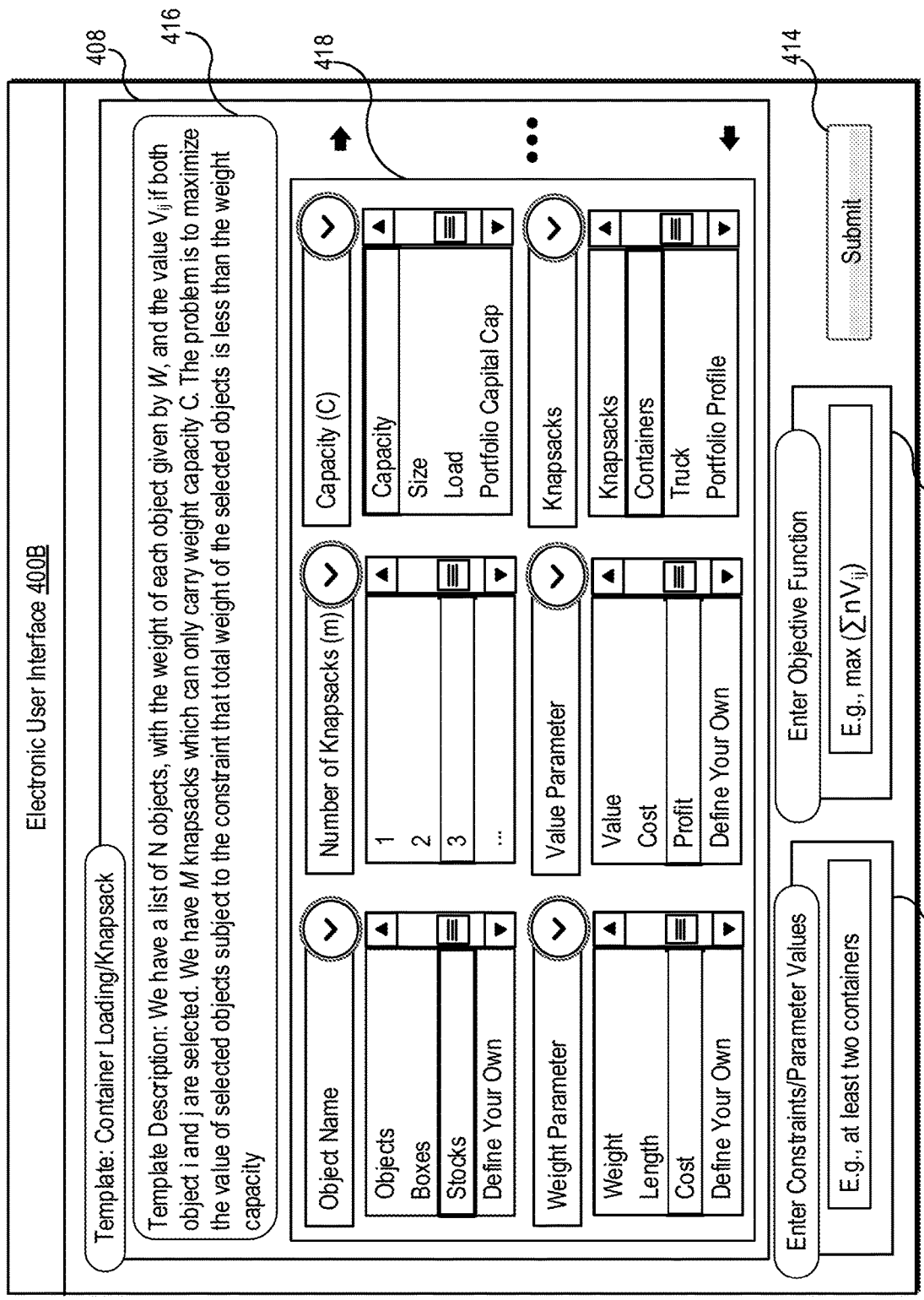
FIG. 4B illustrates another example electronic user interface for a user to provide inputs via a template for an example optimization problem.

FIG. 4B illustrates another example electronic user interface for a user to provide inputs via a template for an example optimization problem, according to at least one embodiment described in the present disclosure. FIG. 4B is explained in conjunction with elements from FIG. 1, FIG. 2, FIG. 3, and FIG. 4A. With reference to FIG. 4B, there is shown an example electronic user interface 400B that may correspond to the electronic user interface 104 of FIG. 1. In the example electronic user interface 400B, there is shown another set of UI elements. The set of UI elements may include a UI element 408, a UI element 410, a UI element 412, and a UI element 414.

The UI element 408, the UI element 410, and the UI element 412 may correspond to a template (such as the selected first template) for the specific optimization problem, which may be of interest to the user 114. In one or more embodiments, the processor 204 may be configured to receive a second user input via the first template for the specific optimization problem. The second user input may include input data for a plurality of parameters of the specific optimization problem, specified in the template. As an example, the processor 204 may be configured to receive the second user input via the UI element 408, the UI element 410, and the UI element 412.

The UI element 408 may be labelled as, for example, "Template: Container Loading/Knapsack". The UI element 408 may include a template description field 416 and a plurality of input fields 418 for the plurality of parameters of the specific optimization problem. The template description field 416 may provide a description of the selected template for the specific optimization problem. In case the specific optimization problem is specified, a corresponding NP problem template may be selected that matches the requirements of the specific optimization problem.

For example, the processor 204 may be configured to select the knapsack problem to determine feasible/optimal solutions for the container loading sub-problem in logistics industry (as specified from the first user input, in FIG. 4A). Accordingly, the template description field 416 may provide details of the Knapsack problem, for example as follows:

"We have a list of N objects, with the weight of each object given by W, and the value Vij if both object i and j are selected. We have M knapsacks which can only carry weight capacity C. The problem is to maximize the value of selected objects subject to the constraint that total weight of the selected objects is less than the weight capacity."

For the container loading problem, the plurality of input fields 418 may include an object name field, a number of Knapsacks field, a capacity field, a weight parameter field, a value parameter field, and a Knapsacks field. The user 114 may be allowed to select or define suitable labels for attributes of the NP problem, such as for objects, capacity, weight parameter, value parameter, and Knapsacks for the Knapsack problem. The object name field may include a set of options, such as objects, boxes, and stocks. Additionally, the object name field may include an option, for example, "define your own" to allow the user 114 to customize the name of the object, as suited for the specific optimization problem. Similarly, the number of Knapsacks field may include another set of options, such as "1", "2", or "3". In case the Knapsack is selected to be a "container", the number of Knapsacks may correspond to the number of containers for the container loading problem. Further, the capacity field may include another set of options, such as capacity, size, load, or portfolio capital cap.

The weight parameter field may include another set of options, such as weight, length, and cost. Additionally, the weight parameter field may include an option, for example, "define your own" to allow the 114 user to customize the name of the weight parameter, as suited for the specific optimization problem. Similarly, the value parameter field may include another set of options, such as value, cost, and profit. Additionally, the value parameter field may include an option, for example, "define your own" to allow the user 114 to customize the name of the value parameter, as suited for the specific optimization problem. The Knapsacks field may include another set of options, such as Knapsacks, containers, trucks, and portfolio profiles.

The UI element 410 may correspond to an input field to specify values for parameters selected via the UI element 408 and/or constraints associated with the specific optimization problem. For example, for the container loading problem, the user 114 may select "stocks" via the object name field, "3" via the number of Knapsacks field, "capacity" via the capacity field, "cost" via the weight parameter field, "profit" via the value parameter field, and "containers" via the Knapsacks field. The user 114 may specify parameter values for stocks, profit, cost, capacity, and containers via the UI element 410. Also, the user 114 may specify constraints, for example, "at least 20,000 USD profit" as a constraint for the container loading problem. In FIG. 4B, the example electronic UI 400B provides the UI element 410 to input values for all parameters selected via the UI element 408. However, in certain embodiments, multiple UI elements may be provided on the example electronic UI 400B to input values of individual parameters specified on the example electronic UI 400B.

The UI element 412 may correspond to an input field to specify an objective function for parameters selected, via the UI element 408, for the specific optimization problem. For example, for the container loading problem, the user 114 may specify the objective function as, for example, $\Sigma n V_{ij}$ where n is number of stocks, Vij is a value if both stocks i and j are selected.

As further shown, the UI element 414 is labelled as, for example, "submit". The UI element 414 may correspond to an option, when selected, submits inputs provided via the UI element 408, the UI element 410, and/or the UI element 412 as the second user input to the electronic device 102. The second user input may be used to provide a call to the optimization solver machine 108 to generate a solution for the specific optimization problem. Subsequent operations for the determination of the one or more solutions for the specific optimization problem are described, for example, in FIGS. 5, 7, 8, 9, 10, and 11.

It should be noted here that the electronic user interface 400B is merely explained and illustrated as an example and should not be construed as limiting for the present disclosure. Other modifications, additions, or omissions may be made to the electronic user interface 400B without departing from the scope of the present disclosure. It should be further noted that the electronic user interface 400B may also include other UI elements, which have been omitted from the present disclosure for the sake of brevity.

Conventional user interfaces were developed keeping focus on expert users who had certain expertise in formulating combinatorial optimization/NP formulations for real world optimization problems. Therefore, these conventional user interfaces lacked to provide suitable information and suitable user-selectable options that could help an ordinary user (who may be a non-expert in constructing NP formulations) to specify the optimization problem and obtain a solution for the specified optimization problem. For example, an ordinary manager who would want to determine an optimal route for his delivery targets may not be able to determine a suitable NP formulation, such as Travelling Salesman formulation.

In contrast, the present disclosure provides the electronic user interface 104 which provides suitable information and suitable user-selectable options which may improve a user's ability to explore and configure parameters associated with a specific optimization problem. It may improve the user's ability to provide a call to optimization solver machines, such as a quantum annealing computer or a digital annealer, to generate a solution for the specific optimization problem, i.e. a real-world problem by formulating them as NP problems. Thus, the electronic user interface 104 may be an improved user interface which delimits the type of information to be displayed and how the information is displayed. This may remove a need for expert users to provide professional assistance to the ordinary user and would be time saving for the ordinary user.

Figure 5:
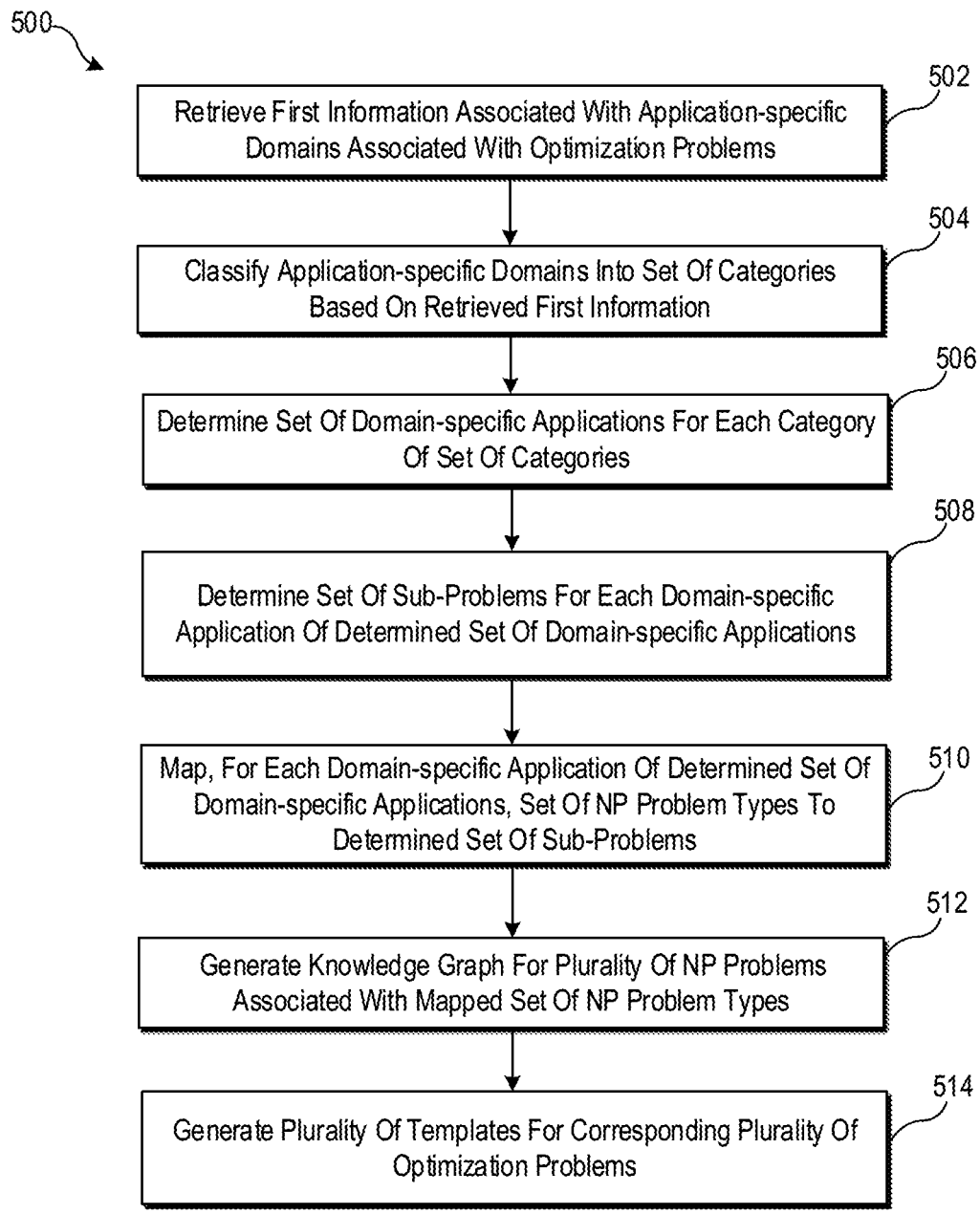
FIG. 5 is a flowchart of an example method of generating templates for optimization problems using knowledge graphs for non-deterministic polynomial-time (NP) problems.

FIG. 5 is a flowchart of an example method of generating templates for optimization problems using knowledge graphs for non-deterministic polynomial-time (NP) problems, arranged in accordance with at least one embodiment described in the present disclosure. FIG. 5 is explained in conjunction with elements from FIG. 1, FIG. 2, FIG. 3, FIG. 4A, and FIG. 4B. With reference to FIG. 5, there is shown a flowchart 500. The example method illustrated in the flowchart 500 may start at 502 and may be performed by any suitable system, apparatus, or device, such as by the example system 202 of FIG. 2.

At 502, first information associated with a plurality of application-specific domains associated with optimization problems may be retrieved. The first information may be retrieved from one of the memory 206, the persistent data storage 208, or other external storage devices. The first information may include labels and description of the plurality of application-specific domains. Some examples of application-specific domains are given in Table 1 of FIG. 3. In one or more embodiments, the processor 204 may be configured to retrieve the first information associated with the plurality of application-specific domains.

At 504, the plurality of application-specific domains may be classified into a set of categories based on the retrieved first information. Each category may be indicative of an industry type, such as manufacturing, logistics, and pharmaceuticals. In one or more embodiments, the processor 204 may be configured to classify the plurality of application-specific domains into the set of categories based on the retrieved first information.

At 506, a set of domain-specific applications may be determined for each category of the set of categories. The set of domain-specific applications may be also referred to as a set of problems for a corresponding category of the set of categories. In certain embodiments, a machine learning (ML) model may be applied to group the set of problems (or the set of domain-specific applications) into several classes by utilizing a natural language description of each problem and tagged information associated with each problem. The ML model may be either an unsupervised learning model or a supervised learning model. Examples of the ML model may include, but are not limited to, k-mean clustering, support vector machines (SVM), random forest, Centroid-based learning models, connectivity-based models, density-based models, probabilistic models, dimensionality reduction, neural networks/deep neural network (DNN) models, Principal Component Analysis (PCA) models, or Singular Value Decomposition (SVD) models.

In one or more embodiments, the processor 204 may be configured to determine the set of domain-specific applications (or set of problems) for each category of the set of categories. Also, the processor 204 may be configured to apply the ML model to group the set of problems (or the set of domain-specific applications) into several classes by utilizing a natural language description of each problem and tagged information associated with each problem.

At 508, for each domain-specific application of the determined set of domain-specific applications, a set of sub-problems may be determined. In one or more embodiments, the processor 204 may be configured to determine the set of sub-problems for each domain-specific application of the determined set of domain-specific applications.

At 510, for each domain-specific application of the determined set of domain-specific applications, a set of NP problem types may be mapped to the determined set of sub-problems. In one or more embodiments, the processor 204 may be configured to map the set of NP problem types to the determined set of sub-problems, for each domain-specific application of the determined set of domain-specific applications. The mapping may be performed to build relationships across application specific domains, problems, sub-problems, and NP-problems.

At 512, a knowledge graph may be generated for a plurality of NP problems associated with the mapped set of NP problem types. The knowledge graph may correspond to a data structure that defines a relationship among different NP problems of the plurality of NP problems. Example of the different NP problems may include, but are not limited to, a graph coloring problem, a clique problem, an independent set problem, a clique cover problem, a minimax matching problem, a knapsack problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, and a K-Plex problem. In one or more embodiments, the processor 204 may be configured to generate the knowledge graph for the plurality of NP problems associated with the mapped set of NP problem types. Different example knowledge graphs are illustrated in FIG. 6A, FIG. 6B, and FIG. 6C.

At 514, a plurality of templates for the corresponding plurality of optimization problems may be generated based on the generated knowledge graph for the plurality of NP problems. Each template of the plurality of templates may include a plurality of input fields for the plurality of parameters of a corresponding optimization problem. The plurality of parameters for the plurality of input fields may include, but are not limited to, information associated with at least a set of application-specific constraints, a set of variables for the corresponding optimization problem, and an objective function for the corresponding optimization problem. In one or more embodiments, the processor 204 may be configured to generate the plurality of templates for the corresponding plurality of optimization problems, based on the generated knowledge graph for the plurality of NP problems associated with the mapped set of NP problem types.

The Control may pass to end. Although the flowchart 500 is illustrated as discrete operations, such as 502, 504, 506, 508, 510, 512, and 514; however, in certain embodiments, such discrete operations may be further divided into additional operations, combined into fewer operations, or eliminated, depending on the particular implementation without detracting from the essence of the disclosed embodiments.

Figure 6A:
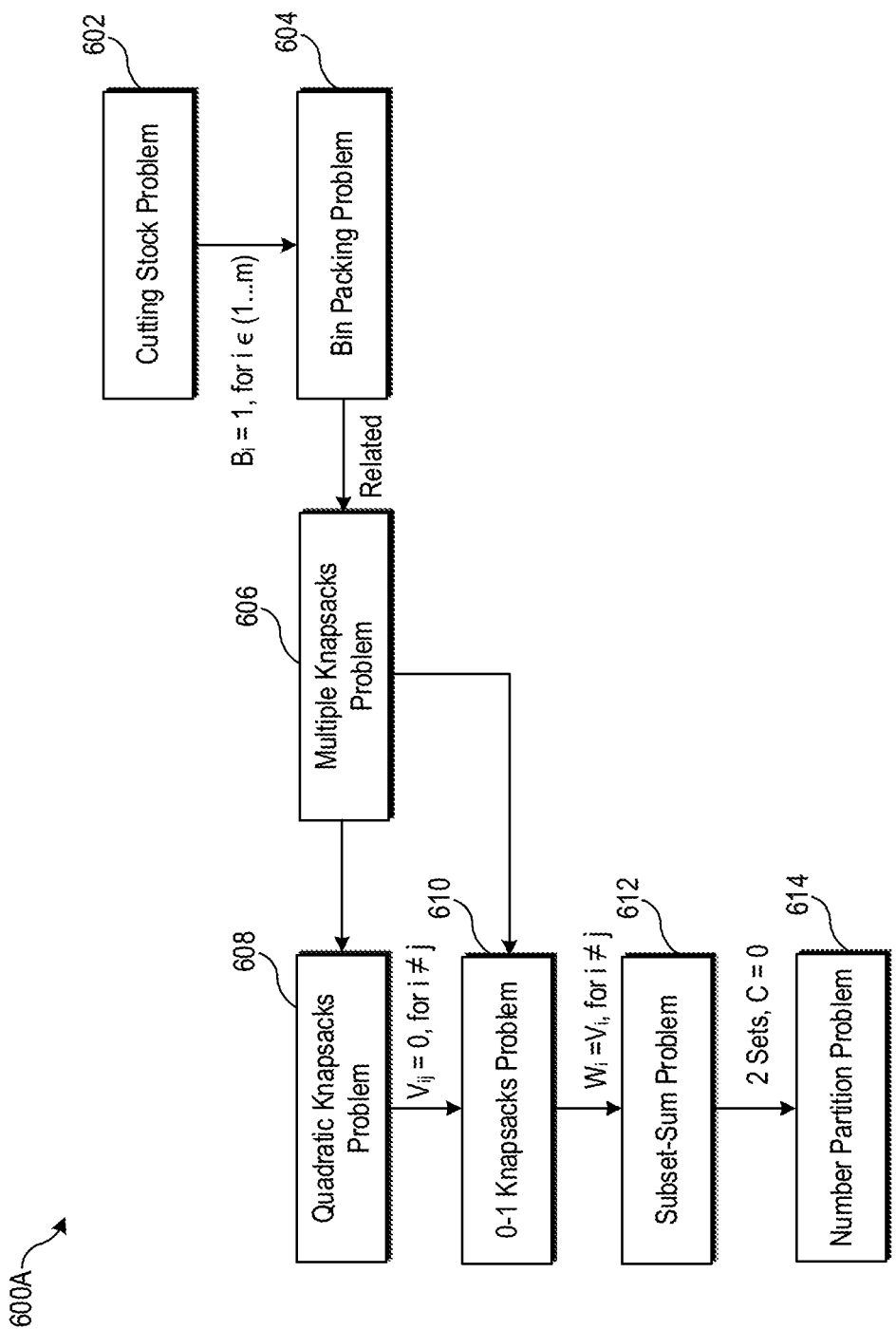
FIG. 6A illustrates a block diagram of an example knowledge graph.
Figure 6B:
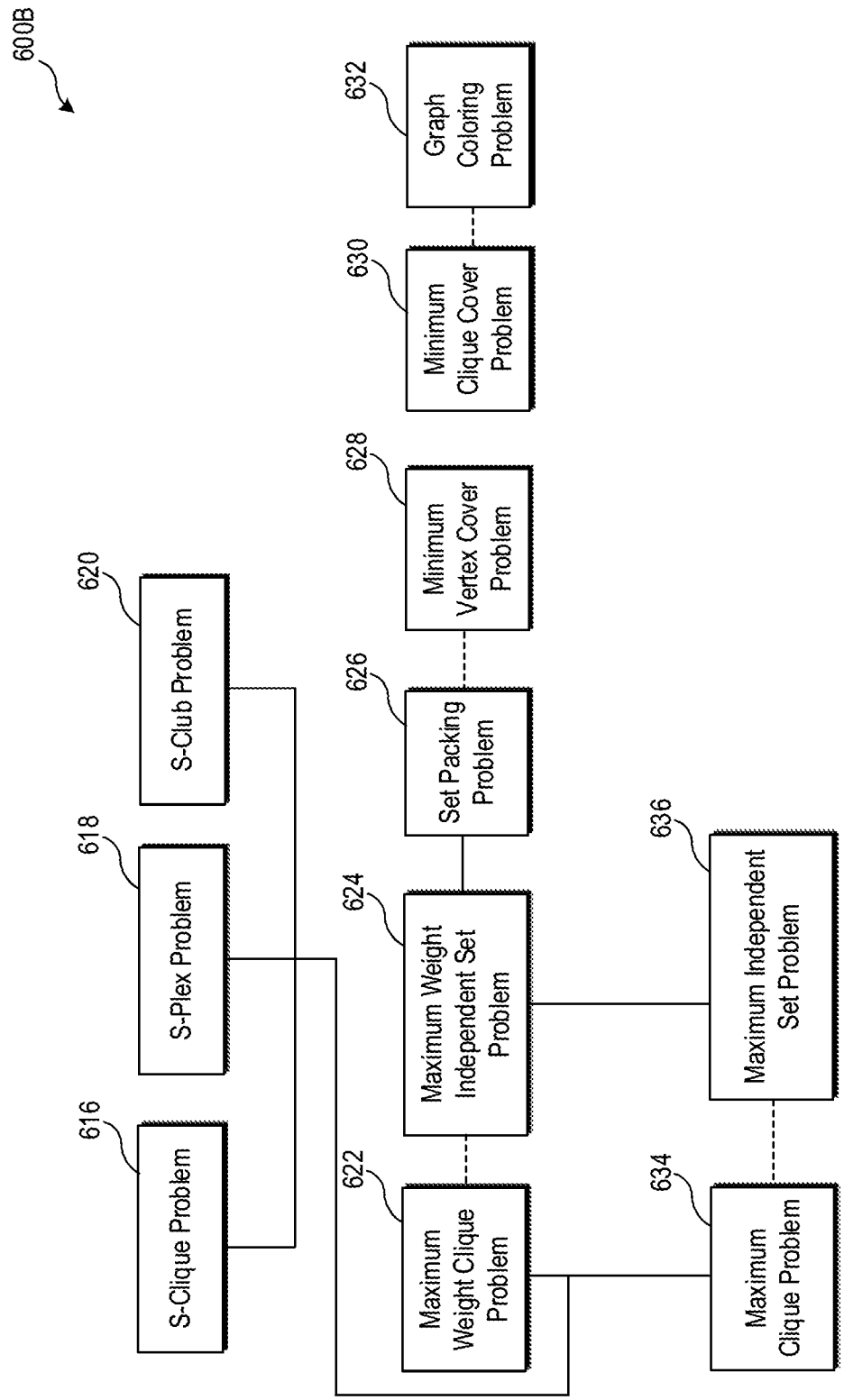
FIG. 6B illustrates a block diagram of another example knowledge graph.
Figure 6C:
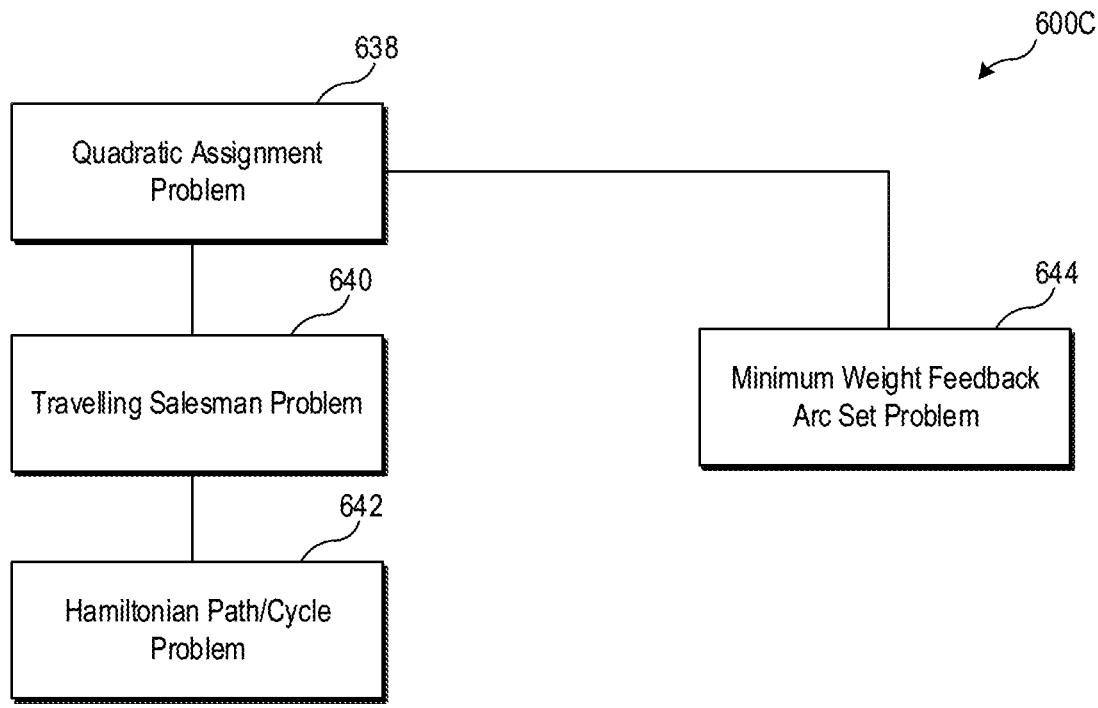
FIG. 6C illustrates a block diagram of another example knowledge graph.

FIG. 6A illustrates a block diagram of an example knowledge graph, arranged in accordance with at least one embodiment described in the present disclosure. FIG. 6A is explained in conjunction with elements from FIGS. 1, 2, 3, 4A, 4B, and 5. With reference to FIG. 6A, there is shown a block diagram of an example knowledge graph 600A. The example knowledge graph 600A may exist among a plurality of NP problems, such as a cutting stock problem 602, a bin packing problem 604, a multiple knapsacks problem 606, a quadratic knapsacks problem 608, a 0-1 knapsacks problem 610, a subset sum problem 612, and a number partition problem 614. The example knowledge graph 600A may be stored by the example system 202.

The cutting Stock problem 602 may include a plurality of attributes (m, c, $\overline{B}$, $\overline{w}$). The cutting stock problem 602 may be stated as: "Given an unlimited number of rolls of length c and m different types of items. At least $B_i$ rolls of length $w_i$, i=1 . . . $w_i$ have to be cut from the base rolls. The objective is to minimize the number of rolls used. In case $B_i$=1, for i∈1 . . . m, the cutting stock problem 602 may be reduced/simplified as the bin packing problem 604, in which objects of different volumes must be packed into a finite number of bins or containers each of volume V in a way that minimizes the number of bins used.

In the example knowledge graph 600A, the bin packing problem 604 may be related to the multiple knapsacks problem 606. The multiple knapsacks problem 606 may include a plurality of attributes (n, m, $\overline{w}$, $\overline{v}$, $\vec{c}$). The multiple knapsacks problem 606 may be stated as: "we have a list of n objects, with the weight of each object given by $\overline{w}$, and the value $\overline{v}$. We have m knapsacks which can only carry weight capacity $\vec{c}$. The problem is to maximize the value of selected objects subject to the constraint that total weight of the selected objects is less than the weight capacity". The multiple knapsacks problem 606 may be generalized to quadratic knapsacks problem 608 or reduced to the 0-1 knapsacks problem 610. In case $V_{ij}$=0, for i≠j, where $V_{ij}$ is the value in case both object i and j are selected, the quadratic knapsacks problem 608 may be reduced to the 0-1 knapsacks problem 610. In case the weight $\overline{w}$ is equal to value $\overline{v}$ for i≠j, the 0-1 knapsacks problem 610 may be reduced to the subset sum problem 612. The subset sum problem 612 may be stated as: "Given a set of non-negative integers S, and a value sum $V_S$, determine if there is a subset $S_N$ of the given set with sum $V_N$ equal to given sum". In case, there are two subsets, the subset sum problem 612 may be reduced to number partition problem 614. It should be noted here that the knowledge graph 600A is merely an example and should not be construed as limiting for the scope of the present disclosure.

FIG. 6B illustrates a block diagram of another example knowledge graph, arranged in accordance with at least one embodiment described in the present disclosure. FIG. 6B is explained in conjunction with elements from FIGS. 1, 2, 3, 4A, 4B, 5, and 6A. With reference to FIG. 6B, there is shown a block diagram of an example knowledge graph 600B. The example knowledge graph 600B may exist among a plurality of NP problems, such as an s-clique problem 616, an s-plex problem 618, an s-club problem 620, a maximum weight clique problem 622, a maximum weight independent set problem 624, a set packing problem 626, a minimum vertex cover problem 628, a minimum clique cover problem 630, a graph coloring problem 632, and a maximum clique problem 634, and a maximum independent set problem 636. The example knowledge graph 600B may be stored by the example system 202.

Each of the s-clique problem 616, the s-plex problem 618, and the s-club problem 620 may be reducible to the maximum weight clique problem 622 and the maximum clique problem 634 based on the plurality of parameters (e.g., constraints, values, variables) for the specific optimization problem. The maximum weight clique problem 622 may be reducible to the maximum clique problem 634 which may be reducible to the maximum independent set problem 636. Similarly, the maximum weight independent set problem 624 may be reducible to the maximum independent set problem 636. It should be noted that the knowledge graph 600B is merely an example and should not be construed as limiting for the scope of the present disclosure.

FIG. 6C illustrates a block diagram of another example knowledge graph, arranged in accordance with at least one embodiment described in the present disclosure. FIG. 6C is s explained in conjunction with elements from FIGS. 1, 2, 3, 4A, 4B, 5, 6A, and 6B. With reference to FIG. 6C, there is shown a block diagram of an example knowledge graph 600C. The example knowledge graph 600C may exist among a plurality of NP problems, such as a quadratic assignment problem 638, a travelling salesman problem 640, a Hamiltonian path/cycle problem 642, and a minimum weight feedback arc set problem 644. The example knowledge graph 600C may be stored by the example system 202.

The quadratic assignment problem 638 may be reducible to the travelling salesman problem 640 or the minimum weight feedback arc set problem 644 based on the plurality of parameters (e.g., constraints, values, variables) for the specific optimization problem. Similarly, the travelling salesman problem 640 may be reducible to the Hamiltonian path/cycle problem 642. It should be noted that the knowledge graph 600C is merely an example and should not be construed as limiting for the scope of the present disclosure.

Figure 7:
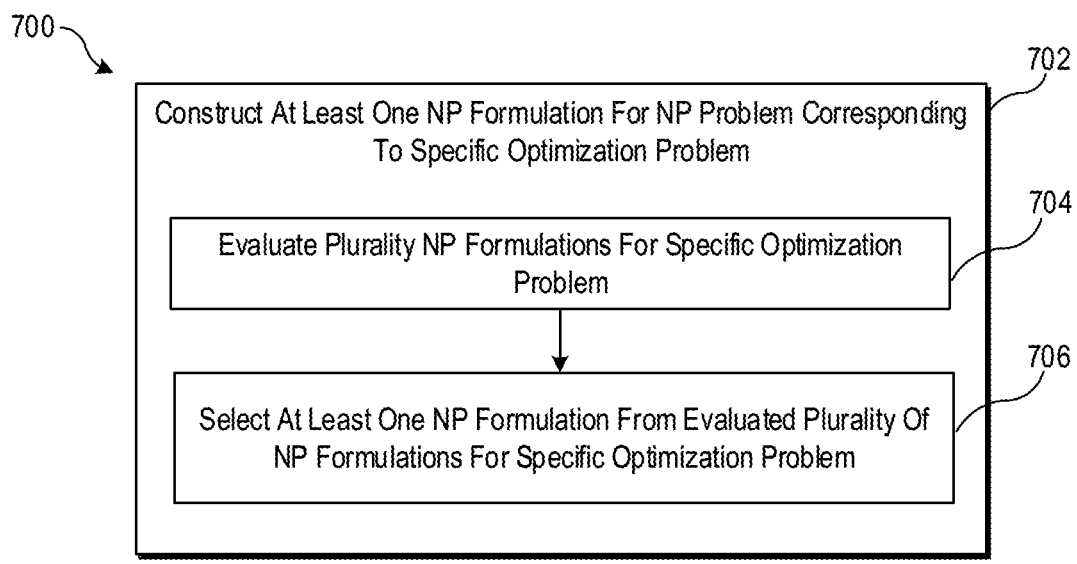
FIG. 7 is a flowchart of an example method of constructing at least one NP formulation for specific optimization problem.

FIG. 7 is a flowchart of an example method of constructing at least one NP formulation for a specific optimization problem, arranged in accordance with at least one embodiment described in the present disclosure. FIG. 7 is explained in conjunction with elements from FIGS. 1, 2, 3, 4A, 4B, 5, 6A, 6B, and 6C. With reference to FIG. 7, there is shown a flowchart 700. The example method illustrated in the flowchart 700 may start at 702 and may be performed by any suitable system, apparatus, or device, such as by the example system 202 of FIG. 2.

At 702, one or more NP formulations may be constructed for the NP problem corresponding to the specific optimization problem. In one or more embodiments, the processor 204 may be configured to construct one or more NP formulations for the NP problem corresponding to the specific optimization problem, based on the received second user input. The construction of the one or more NP formulations may correspond to a mapping of the plurality of parameters of the specific optimization problem to a plurality of attributes of the NP problem.

For example, the plurality of parameters for a container loading problem may include a number of stocks, a number of containers, a capacity of each container, a value per stock, constraints, other conditions, and the like. The processor 204 may be configured to map the plurality of parameters to a plurality of attributes of a corresponding NP problem, for example, a multiple knapsacks problem. The multiple knapsack problem may include the plurality of attributes (n, m, $\overline{w}, \overline{v}, \vec{c}$), where n represents the number of objects, m (m<n) represents the number of knapsacks, $\overline{w}$ and $\overline{v}$ are the vectors of weight and value for each object, respectively, and $\vec{c}$ is the vector of total weight capacity which can be carried by m knapsacks.

In one or more embodiments, the processor 204 may be configured to determine the NP problem that may be suitable for the specific optimization problem based on the taxonomy information and the knowledge graph(s) (as shown in FIGS. 6A, 6B, and 6C) for the plurality of NP problems. More specifically, the input data provided via the second user input may be used to search for the NP problem that is suitable (or optimal) for the specific optimization problem from the knowledge graph(s). The construction of the one or more NP formulations is further described from 704 to 706.

At 704, a plurality of NP formulations may be evaluated for the specific optimization problem based on the knowledge graph(s) for the plurality of NP problems and the received second user input. In one or more embodiments, the processor 204 may be configured to evaluate the plurality of NP formulations for the specific optimization problem based on the knowledge graph(s) for the plurality of NP problems and the received second user input. In the evaluations, the plurality of NP formulations may be identified by searching the knowledge graph(s) and/or the taxonomy information for multiple NP problems having attributes/constraints mapping to the plurality of parameters for the specific optimization problem.

For example, as also discussed in FIGS. 4A and 4B, for the container loading problem, multiple NP problems may be identified. Such multiple NP problems may include a bin-packing problem, a multiple knapsacks problem, a 0-1 knapsacks, a quadratic knapsacks problem, and a subset sum problem. Based on input data provided via the second user input, it may be determined whether the bin-packing problem can be reduced and simplified to multiple knapsacks problem. Further, it may be determined whether the quadratic knapsacks problem can be reduced to the 0-1 knapsacks problem, in case the value, $V_{ij}=0$, for $i \neq j$, where $V_{ij}$ is the value in case both object i and j are selected (see FIG. 6A). Otherwise, it may be determined whether the multiple knapsacks problem can be generalized to quadratic knapsacks problem. Also, it may be further determined whether the 0-1 knapsacks problem can be reduced to a subset sum problem, in case the weight $\overline{w}$ is equal to value $\overline{v}$ for $i \neq j$ (see FIG. 6A).

At 706, one or more NP formulations may be selected from the evaluated plurality of NP formulations for the specific optimization problem. As an example, the one or more NP formulation may be selected based on a number of constraints or attributes specified in each NP formulation of the evaluated plurality of NP formulations. The selection of the one or more NP formulations may be crucial to decide the best/optimal NP formulation(s) for the specific optimization problem. In one or more embodiments, the processor 204 may be configured to select the one or more NP formulations from the evaluated plurality of NP formulations for the specific optimization problem. The selected one or more NP formulations may correspond to the constructed one or more NP formulations for the specific optimization problem.

It should be noted here that the selection/construction of the one or more NP formulations may be critical for determination of one or more solutions for the specific optimization problem, as an accurate selection of the one or more NP formulations may determine the quality/accuracy of the one or more solutions. In conventional scenarios, NP formulations are created by expert users and thus, the accuracy in selection of the best/optimal NP formulation(s) depends on experience of the expert users. Any inappropriate formulation may lead to determination of inferior solutions.

In certain embodiments, the selection of one or more NP formulations may be may be based on a number of variables in an Integer Programming (IP) model. For example, NP formulations of a maximum weight clique problem and a maximum weight independent set problem are very similar. The only difference is that the graph of the maximum weight clique problem may be considered as a complementary graph for the maximum weight independent set problem, and vice versa. In order to select one of the NP formulation, the number of edges in the graph may be checked. The fewer number of constraints (e.g., edges) may pose a reduced computation complexity.

Although the flowchart 700 is illustrated as discrete operations, such as 702, 704, and 706. However, in certain embodiments, such discrete operations may be further divided into additional operations, combined into fewer operations, or eliminated, depending on the particular implementation without detracting from the essence of the disclosed embodiments.

Figure 8:
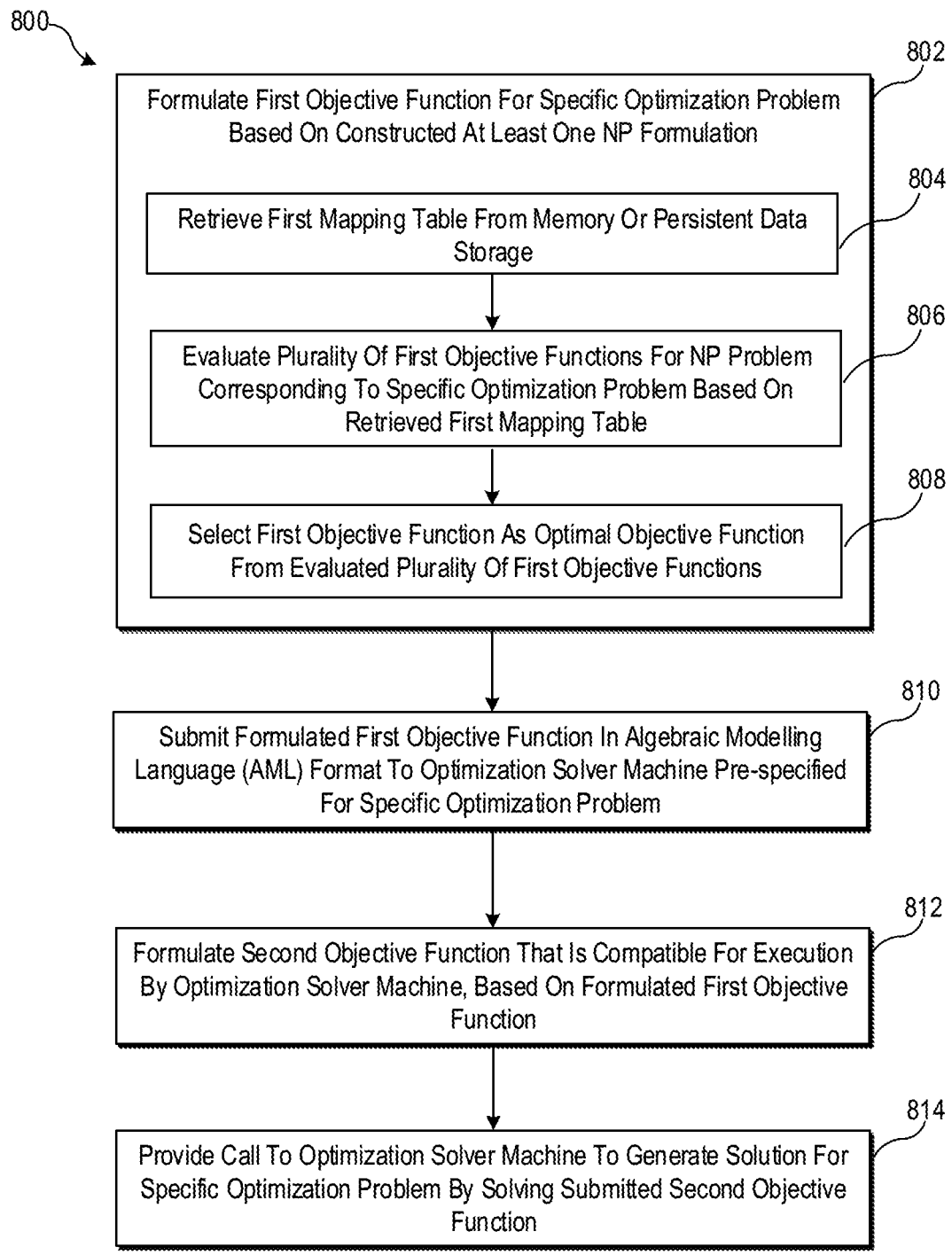
FIG. 8 is a flowchart of an example method of formulating first objective function and second objective function from at least one NP formulation for specific optimization problem.

FIG. 8 is a flowchart of an example method of formulating first objective function and second objective function from at least one NP formulation for specific optimization problem, arranged in accordance with at least one embodiment described in the present disclosure. FIG. 8 is explained in conjunction with elements from FIGS. 1, 2, 3, 4A, 4B, 5, 6A, 6B, 6C, and 7. With reference to FIG. 8, there is shown a flowchart 800. The example method illustrated in the flowchart 800 may start at 802 and may be performed by any suitable system, apparatus, or device, such as by the example system 202 of FIG. 2.

At 802, a first objective function for the specific optimization problem may be formulated, based on the constructed one or more NP formulations. In one or more embodiments, the processor 204 may be configured to formulate the first objective function for the specific optimization problem based on the constructed one or more NP formulations. In case there are more than one NP formulations, multiple first objective functions may be formulated for the specific optimization problem. The first objective function may include a relationship (i.e. a mathematical relationship) among the plurality of attributes of an NP problem, as specified by corresponding NP formulation for the specific optimization problem. The first objective function may also be referred to as a mathematical formulation of a corresponding NP formulation. In order to generate optimal solution(s) for the specific optimization problem, a global minima of the first objective function may need to be determined by searching for the optimal solution(s) from a discrete solution space.

In one or more embodiments, the first objective function may be one of:
a Quadratic Unconstrained Binary Optimization (QUBO) function,
a first Quadratic Binary Optimization function with a set of equality constraints,
a second Quadratic Binary Optimization function with a set of inequality constraints,
a third Quadratic Binary Optimization function with a set of small (0 or 1) inequality constraints, or
a Mixed Linear Integer Programming (MILP) function.

The QUBO function may be given by equation (1), as follows:

$$\min(y=x^T \cdot Q \cdot x) \quad (1)$$

where x is a vector of binary decision variables and Q is a square matrix of constants.

The first Quadratic Binary Optimization function with equality constraints may be given by equation (2), as follows:

$$\min(y=x^T \cdot Q \cdot x) \text{ such that } A \cdot x = b, x \in \{0,1\}^n \quad (2)$$

Similarly, the second Quadratic Binary Optimization function with a set of inequality constraints may be given by equation (3), as follows:

$$\min(y=x^T \cdot Q \cdot x) \text{ such that } A_1 \cdot x = b_1, A_2 \cdot x \geq b_2, A_3 \cdot x \leq b_3 \quad (3)$$

The second Quadratic Binary Optimization function is same as equation (4) but without limiting the Right Hand Side (RHS) of inequality constraint to be 0 or 1.

Similarly, the third Quadratic Binary Optimization function with a set of small (0 or 1) inequality constraints when the elements in the RHS of inequality constraint vector ($b_2$ or $b_3$) are either 0 or 1, may be given by equation (4), as follows:

$$\min(y=x^T \cdot Q \cdot x) \text{ such that } A_1 \cdot x = b_1, A_2 \cdot x \geq b_2, A_3 \cdot x \leq b_3, x \in \{0,1\}^n \quad (4)$$

The MILP function may be given by equation (5), as follows:

$$\min(y=C^T \cdot x) \text{ such that } A_1 \cdot x = b_1, A_2 \cdot x \geq b_2, A_3 \cdot x \leq b_3, x \in Z^n \quad (5)$$

The formulation of the first objective function is further described from 804 to 808.

At 804, a first mapping table may be retrieved from the memory 206 or the persistent data storage 208. The first mapping table may include a list of NP problems mapped to a corresponding list of objective functions. In one or more embodiments, the processor 204 may be configured to retrieve the first mapping table from the memory 206 or the persistent data storage 208. An example of the first mapping table is provided in Table 2, as follows:

TABLE 2

Example of First Mapping Table

| Type of NP Problem | Type of Mathematical formulation |
|---|---|
| Number partitions, max-cut | Quadratic Unconstrained Binary Optimization |
| Quadratic assignment, Set Partitioning, Job Shop Scheduling | Quadratic Binary Optimization with equality constraints |

TABLE 2-continued

Example of First Mapping Table

| Type of NP Problem | Type of Mathematical formulation |
|---|---|
| Max Clique, Vertex Cover, Set Packing, Set Covering, Coloring, Satisfiability, Feedback set, Travel Salesman | Quadratic Binary Optimization with small (0 or 1) inequality constraints |
| Knapsack, Bin Packing, Cutting Stock, Subset Sum, Vehicle Routing, Generalized assignment, k-plex | Quadratic Binary Optimization with inequality constraints |
| Knapsack, Bin Packing, Cutting Stock, Subset Sum, Vehicle Routing, Generalized assignment, k-plex, Set Covering, Set partitioning, Set Packing, Facility Location, Quadratic assignment, Vertex Coloring, Travel Salesman | Mixed Linear Integer Programming (MILP) |

At 806, a plurality of first objective functions may be evaluated for the NP problem corresponding to the specific optimization problem, based on the retrieved first mapping table. In one or more embodiments, the processor 204 may be configured to evaluate the plurality of first objective functions for the NP problem corresponding to the specific optimization problem, based on the retrieved first mapping table.

From Table 2, it may be observed that there exists multiple possible mathematical formulations (i.e. first objective functions) for a single NP problem. As an example, the knapsack problem can be either formulated as a quadratic binary optimization function with inequality constraints or as a MILP function. As another example, there may exist three different mathematical formulations for a Vehicle Routing Problem, including a vehicle flow formulation, a commodity flow formulation, and a set partitioning formulation.

At 808, the first objective function may be selected as an optimal objective function from the evaluated plurality of first objective functions, based on a number of attributes/constraints specified for each objective function of the evaluated plurality of first objective functions. In one or more embodiments, the processor 204 may be configured to select the first objective function as an optimal objective function from the evaluated plurality of first objective functions, based on the number of attributes/constraints specified for each objective function of the evaluated plurality of first objective functions.

As an example, more number of attributes for a mathematical formulation (an objective function and constraints) may lead to larger variations in solutions, i.e. a larger solution space and a larger computational complexity. Similarly, more number of constraints may help to reduce larger solution space to a smaller solution space, leading to a decreased computational complexity for determination of solutions for the specific optimization problem.

As another example, for cutting stock problem, there are two mathematical formulations, which are given by formulations (6) and (7), as follows:

$$\min \sum_{j=1}^{U} y_j \text{ such that} \quad (6)$$

$$\sum_{i=1}^{m} w_i x_i \leq c y_j, j = 1 \ldots U$$

$$\sum_{j=1}^{U} x_{ij} \geq b_i, i = 1 \ldots m$$

$$x_{ij} \in Z_+, y_j \in B, i = 1 \ldots m; j = 1 \ldots U$$

Where, $x_{ij} \in Z_+$ denotes how many times item type (i) is cut in roll (j); and $y_j \in (0,1)$ denotes whether roll (j) is used for cutting or not.

$$\min \sum_{s \in S} x_s \quad (7)$$

$$\sum_{s \in S} s_i x_s \geq b_i, i = 1 \ldots m, x \geq 0$$

As formulation (7) has more constraints to filter solution space to obtain better solution as compared to formulation (6), formulation (7) may be selected as the optimal formulation (i.e. the first objective function and constraints).

At 810, the formulated first objective function may be submitted in an Algebraic Modelling Language (AML) format to the optimization solver machine 108 pre-specified for the specific optimization problem. The AML format may correspond to a format that describes the formulated first objective function as a code of a high-level computer programming language. In one or more embodiments, the processor 204 may be configured to submit the formulated first objective function in the AML format to the optimization solver machine 108 pre-specified for the specific optimization problem.

The code may be used by the optimization solver machine 108 to generate the solution for the NP problem corresponding to the specific optimization problem. As an example, the AML format may be a Python-based open-source Optimization Modeling Language (PYOMO) format, A-Mathematical Programming Language (AMPL), and the like. The AML format of the formulated first objective function may not be directly executed, but instead may be used by the optimization solver machine 108 or other external optimization solver machines to generate one or more solutions for the NP problem corresponding to the specific optimization problem.

At 812, a second objective function that may be compatible for execution by the optimization solver machine 108 may be formulated based on the formulated first objective function. In one or more embodiments, the processor 204 may be configured to formulate the second objective function that may be compatible for execution by the optimization solver machine 108, based on the formulated first objective function. The second objective function may be an unconstrained mathematical formulation on a quadratic surface. The formulated second objective function may include a relationship between a vector of binary decision variables (x) and a Q-matrix corresponding to the formulated first objective function.

As an example, the second objective function may be formulated as QUBO model, which may be expressed by an equation (8) (as an optimization problem), as follows:

$$\min(y = X^T Q X) \quad (8)$$

Where, x is a vector of binary decision variables and Q is a square Q-matrix of constants. The Q-matrix may be a symmetric matrix or an upper triangular matrix. The Q-matrix in the equation (8) may be required by the optimization solver machine 108, such as a digital annealer or a quantum annealer device, to generate a solution for the NP problem corresponding to the specific optimization problem. Further details of the formulation of the second objective function is provided, for example, in FIG. 9.

At 814, a call may be provided to the optimization solver machine 108 generate the solution for the specific optimization problem by solving the submitted second objective function. In one or more embodiments, the processor 204 may be configured to provide the call to the optimization solver machine 108 to generate the solution for the specific optimization problem by solving the submitted second objective function. As an example, the call may be an API request in which one or more solutions for the submitted second objective function in the AML format may be requested from the optimization solver machine 108.

In one or more embodiments, the optimization solver machine 108 may be configured to apply searching methods and/or meta-heuristic methods, such as quantum annealing, to search for a global minimum of the second objective function and further identify the solution from a discrete solution space for the NP problem corresponding to the specific optimization problem.

In an exemplary embodiment, the optimization solver machine 108 may be a digital annealer, a quantum annealing device or a generalized quantum computing device (refer to FIG. 1). In such a case, the optimization solver machine 108 may be configured to convert the second objective function into an Ising function, in which attributes and relationship among the attributes of the second objective function are based on the Ising model. The optimization solver machine 108 may be further configured to apply a quantum annealing method to search for a global minimum of the Ising function and further identify a solution from the discrete solution space for the NP problem corresponding to the specific optimization problem.

As an example, from equation (8), the optimization solver machine 108 may be configured to retrieve the Q-matrix (i.e. the matrix that represents the NP problem) and search for values of the vector (x) of binary decision variables for which the equation (8) is satisfied. The values of the vector (x) of binary decision variables may correspond to the solution of the NP problem corresponding to the specific optimization problem.

Although the flowchart 800 is illustrated as discrete operations, such as 802, 804, 806, 808, 810, 812, and 814. However, in certain embodiments, such discrete operations may be further divided into additional operations, combined into fewer operations, or eliminated, depending on the particular implementation without detracting from the essence of the disclosed embodiments.

Figure 9:
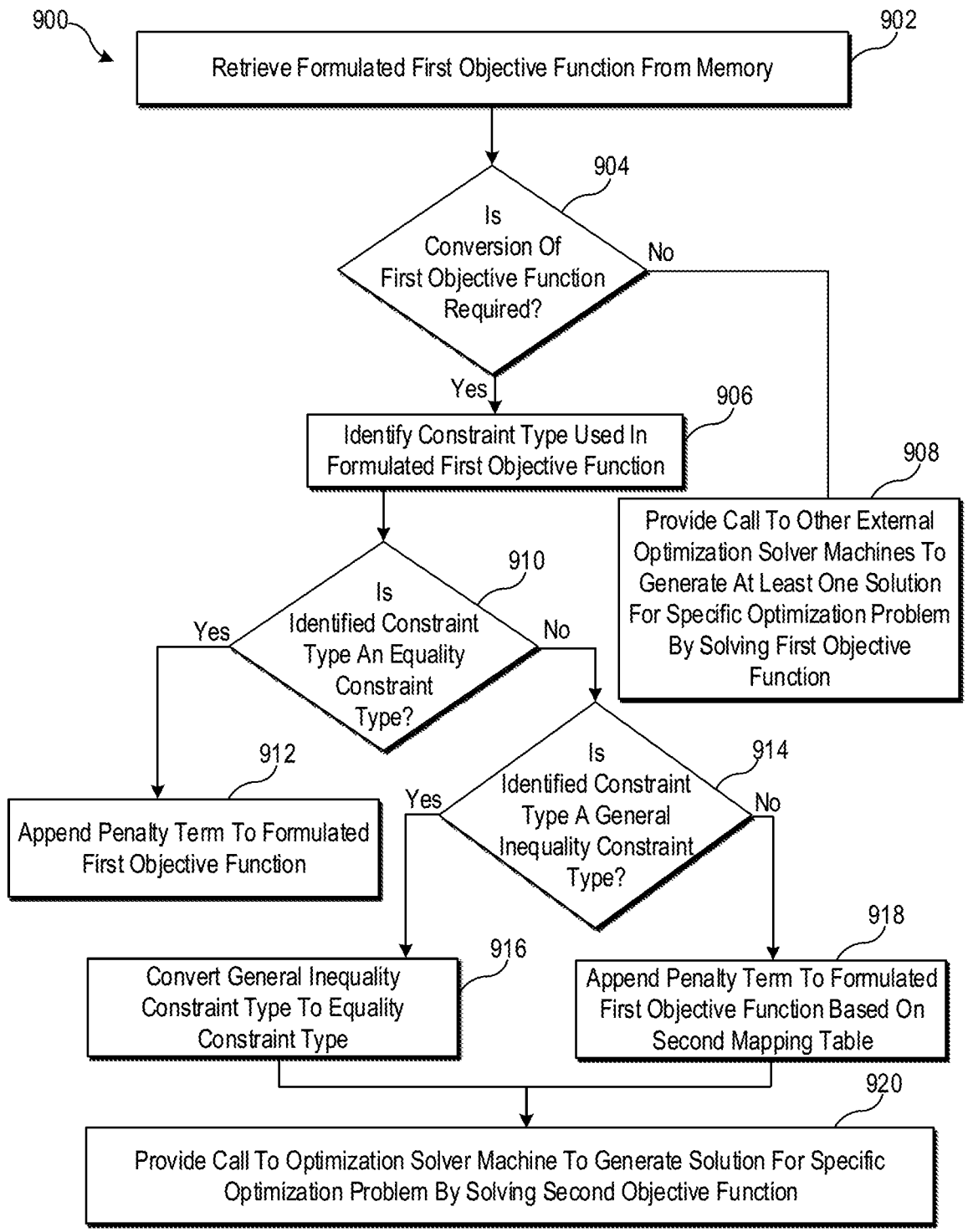
FIG. 9 is a flowchart of an example method for formulating second objective function based on first objective function for specific optimization problem.

FIG. 9 is a flowchart of an example method for formulating second objective function based on first objective function for a specific optimization problem, arranged in accordance with at least one embodiment described in the present disclosure. FIG. 9 is explained in conjunction with elements from FIGS. 1, 2, 3, 4A, 4B, 5, 6A, 6B, 6C, 7, and 8. With reference to FIG. 9, there is shown a flowchart 900. The example method illustrated in the flowchart 900 may start at 902 and may be performed by any suitable system, apparatus, or device, such as by the example system 202 of FIG. 2.

At 902, the formulated first objective function may be retrieved from the memory 206. In one or more embodiments, the processor 204 may be configured to retrieve the formulated first objective function from the memory 206.

At 904, it may be determined whether the conversion of the first objective function to the second objective function is required. In one or more embodiments, the processor 204 may be configured to determine whether the conversion of the first objective function to the second objective function is required. In case the conversion is required, control may pass to 906. Otherwise, control may pass to 908. Whether the conversion is required may be determined based on a type of optimization solver machine pre-specified to generate the solution for the specific optimization problem.

For example, in case the type of optimization solver machine corresponds to the digital annealer or the quantum annealing computer, the conversion may be required. The digital annealer may require a QUBO formulation in the form of the second objective function for the NP problem corresponding to the specific optimization problem. The first objective function may be required to be modified to obtain the second objective function. Otherwise, the conversion may not be required and the first objective function may be submitted in a compatible AML format to the type of optimization solver machine which uses software solvers, for example, such as Gurobi solver or open source software solvers, such as Solving Constraint Integer Programs (SCIP) solver, Google OR-tool, GNU Linear Programming Kit (GLPK) solver.

At 906, a constraint type used in the formulated first objective function may be identified. The constraint type may be one of an inequality constraint type or an equality constraint type in the formulated first objective function. In one or more embodiments, the processor 204 may be configured to identify the constraint type used in the formulated first objective function.

At 908, a call may be provided to other external optimization solver machines to generate one or more solutions for the specific optimization problem by solving the first objective function. The call may be provided to the other external optimization solver machines in case the type of optimization solver machine uses software solvers that are compatible with polynomial functions with non-binary variables and doesn't requires a conversion of the first objective function to a QUBO function, i.e. the second objective function. In one or more embodiments, the processor 204 may be configured to provide the call to the other external optimization solver machines to generate the solution for the specific optimization problem by solving the first objective function.

At 910, it may be determined whether the identified constraint type is the equality constraint type. In case the identified constraint type is the equality constraint type, control may pass to 912. Otherwise, control may pass to 914. In one or more embodiments, the processor 204 may be configured to determine whether the identified constraint type is the equality constraint type.

At 912, a penalty term may be appended to the formulated first objective function. The penalty term may be appended to convert the first objective function to the second objective function. In one or more embodiments, the processor 204 may be configured to append the penalty term to the formulated first objective function. The penalty term may be appended such that the effect of constraints pre-specified for the first objective function may alternatively be achieved while the optimization solver machine 108 generates the solution for the second objective function and avoids incurring penalties. More specifically, the penalty term may be appended such that the penalties equal zero for feasible solutions and a positive value for infeasible solutions of the discrete solution space. The optimization sol ver machine 108 may be configured to generate the solution by solving the second objective function. The second objective function may equal the first objective function, in case the penalty term is zero.

As an example, the first objective function may be given by equation (9), as follows:

$$\min(y=x^T Q x)$$

$$\text{such that } A \cdot x = b, x \in \{0,1\}^n \quad (9)$$

From equation (9), the first objective function may have the equality constraint type. Thus, a quadratic penalty term $(P \cdot (Ax-b)^T \cdot (Ax-b))$ may be appended to the first objective functions (given by equation (9) to obtain the second objective function, which may be given by equation (10), as follows:

$$\min(y=x^T Q x + P \cdot (Ax-b)^T \cdot (Ax-b)) \quad (10)$$

$x \in \{0,1\}^n$, P is a large number of constant

At 914, it may be determined whether the identified constraint type is the general inequality constraint type. In one or more embodiments, the processor 204 may be configured to determine whether the identified constraint type is the general inequality constraint type. In case the identified constraint type is the general inequality constraint type, control may pass to 916. Otherwise, control may pass to 918.

At 916, the general inequality constraint type may be converted to the equality constraint type. In one or more embodiments, the processor 204 may be configured to convert the general inequality constraint type to the equality constraint type. The conversion may be performed to formulate the second objective function based on the first objective function. Two of the example methods are described herein to formulate the second objective function based on the first objective function, in cases where the identified constraint type is the general inequality constraint type.

Example Method 1: a slack or surplus variable with binary or integer encoding may be appended to the formulated first objective function to convert the general inequality constraint type to the equality constraint type. In one or more embodiments, the processor 204 may be configured to append the slack or the surplus variable with binary or integer encoding to the formulated first objective function to convert the general inequality constraint type to the equality constraint type.

As an example, for each constraint $\Sigma_{i=1}^{n} A_{3i} \cdot x_i \leq b_{3j}$, $\forall j=1 \ldots m$, where $b_{3j} \geq 0$, a slack variable $s_j$ may be appended to the first objective function to convert the general inequality constraint type to the equality constraint type such that $\Sigma_{i=1}^{n} A_{3i} \cdot x_i + s_j = b_{3j} \Rightarrow s_j = b_{3j} - \Sigma_{i=1}^{n} A_{3i} \cdot x_i$. To get a possible upper bound $U_j$ for $s_j$, $U_j = b_{3j} - \Sigma_{i=1, A_{3i} < 0}^{n} A_{3i} \cdot s_j$ may be encoded by a set of binary variables such that $0 \leq s_j \leq U_j$, that is, $s_j = \Sigma_{i=0}^{\lceil \ln U_j \rceil} 2^i \cdot e_i$. The slack variable may be further replaced by a list of binary variables ($e_i$). Thereafter, the penalty term may be further appended to the first objective function (same as 912).

As another example, for each constraint $\Sigma_{i=1}^{n} A_{3i} \cdot x_i \geq b_{3j}$, $\forall j=1 \ldots k$, where $b_{3j} \geq 0$, a surplus variable $s_j$ may be appended to the first objective function to convert the general inequality constraint type to the equality constraint type such that $\Sigma_{i=1}^{n} A_{3i} \cdot x_i - s_j = b_{3j} \Rightarrow s_j = \Sigma_{i=1}^{n} A_{3i} \cdot x_i - b_{3j}$. To get a possible upper bound $U_j$ for $s_j$, $U_j = \Sigma_{i=1, A_{3i} > 0}^{n} A_{3i} - b_{3j}$. Thereafter, $s_j$ may be encoded by a set of binary variables such that $0 \leq s_j \leq U_j$, that is, $s_j = \Sigma_{i=0}^{\lceil \ln U_j \rceil} 2^i \cdot e_i$. The surplus variable may be replaced by the list of binary variables ($e_i$) and the penalty term may be appended to the first objective function (same as 912).

Example Method 2: The processor 204 may be configured to specify to the optimization solver machine 108 to apply a branch-and-bound method that uses Lagrangian duality to directly generate the solution for the specific optimization problem by solving the first objective function, i.e. a constrained optimization function. The branch-and-bound method is known in the art and therefore the details have been omitted for the sake of brevity. Also, in case the first objective function is an MILP function, i.e. based on equation (5), each integer variable with binary variables may be encoded such that the encoded values cover all possible values.

At 918, a penalty term may be appended to the formulated first objective function based on a second mapping table. The penalty term may be appended to convert the first objective function to the second objective function. Also, the penalty term may be appended to the formulated first objective function based on a determination that the determined constraint type used in the formulated first objective function is one of the equality constraint type or the inequality constraint type. In one or more embodiments, the processor 204 may be configured to append the penalty term to the formulated first objective function based on the determination that the determined constraint type used in the formulated first objective function is one of the equality constraint type or the inequality constraint type. The penalty term may be specified in the second mapping table that includes a list of penalty terms mapped to a corresponding list of constraint types applicable for the formulated first objective function. An example of the second mapping table is provided in Table 3, as follows:

TABLE 3

Second Mapping Table

| Classical Constraint | Penalty Term |
| --- | --- |
| $x + y \leq 1$ | $P(xy)$ |
| $x + y \geq 1$ | $P(1 - x - y + xy)$ |
| $x + y = 1$ | $P(1 - x - y + 2xy)$ |
| $x \leq y$ | $P(x - xy)$ |
| $x_1 + x_2 + x_3 \leq 1$ | $P(x_1 x_2 + x_1 x_3 + x_2 x_3)$ |
| $x = y$ | $P(x + y - 2xy)$ |

Where, P (.) denotes a polynomial function.

In certain instances, a summary inequality term associated with the first objective function may be analyzed to decide the penalty term to be appended to the first objective function. Some exemplary conditions for the summary inequality term are provided, as follows:

Exemplary Condition "1": It may be determined whether the summary inequality term (i.e. $\Sigma_{i=1}^{m} x_i \leq 1$) for the first objective function includes multiple variables (i.e. $x_1$, $x_2$, $x_3$ ... and $x_m$). In cases where the summary inequality term includes multiple variables, any two of the variables (i.e. $x_i$, $x_j$) may be selected and a penalty term $(P \cdot x_i \cdot x_j)$ may be appended to the first objective function. Here, P is a large number of constant.

Exemplary Condition "2": It may be determined whether the summary inequality term (i.e. $\Sigma_{i=1}^{m} x_i \geq 1$) for the first objective function includes multiple variables (i.e. $x_1$, $x_2$, $x_3$ ... and $x_m$). In cases where the summary inequality term includes multiple variables, a penalty term (i.e. $P \cdot \Pi_{i=1}^{m}(1-x_i)$) may be appended to convert a higher order polynomial form of the first objective function to a binary polynomial form, i.e. the second objective function. Alternatively, a surplus integer variable s with the range in [0, m−1] may be added to convert the inequality constraint to equality constraint. That is, a penalty term (i.e. $P \cdot (\Sigma_{i=1}^{m} x_i - 1 - s)^2$) may be appended to the first objective function. Here, P is a large number of constant. The integer variable s may be encoded by a set of binary variables using logarithmic or one-hot encoding.

Exemplary Condition "3": It may be determined whether the summary inequality term (i.e. $\Sigma_{i=1}^{m} x_i = 1$) for the first objective function includes multiple variables (i.e. $x_1$, $x_2$, $x_3$ ... and $x_m$). In cases where the summary inequality term includes multiple variables, a penalty term (i.e. $P \cdot (1 - \Sigma_{i=1}^{m} \Pi_{j=1, j \neq i}^{m} x_i (1-x_j)))$ may be appended to the first objective function to convert a higher order polynomial form of the first objective function to a binary polynomial form, i.e. the second objective function.

Exemplary Condition "4": It may be determined whether the summary inequality term for the first objective function includes exactly two variables, a penalty term may be appended to the first objective function based on the second mapping table (e.g., Table 3).

At 920, a call may be provided to the optimization solver machine 108 to generate the solution for the specific optimization problem by solving the second objective function. In one or more embodiments, the processor 204 may be configured to provide the call to the optimization solver machine 108 to generate the solution for the specific optimization problem by solving the second objective function. As an example, the call may be an API request in which one or more solutions for the submitted second objective function in the AML format may be requested from the optimization solver machine 108.

Although the flowchart 900 is illustrated as discrete operations, such as 902, 904, 906, 908, 910, 912, 914, 916, 918, and 920; however, in certain embodiments, such discrete operations may be further divided into additional operations, combined into fewer operations, or eliminated, depending on the particular implementation without detracting from the essence of the disclosed embodiments.

Figure 10:
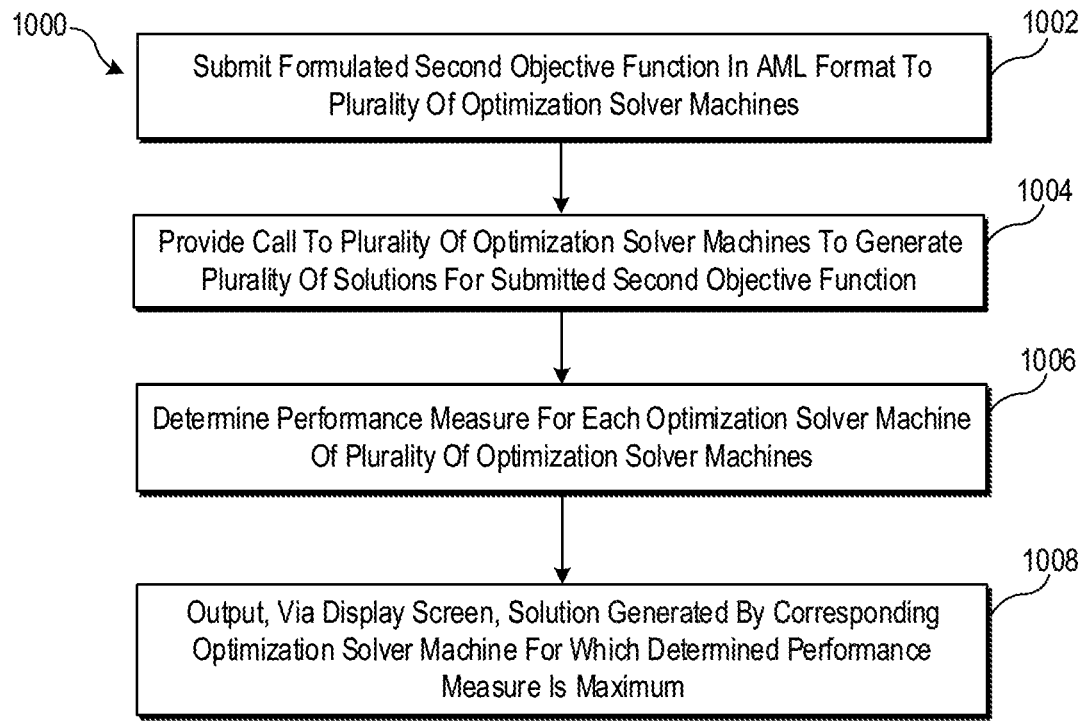
FIG. 10 is a flowchart of an example method of measuring performance of multiple optimization solver machines.

FIG. 10 is a flowchart of an example method of measuring performance of multiple optimization solver machines, arranged in accordance with at least one embodiment described in the present disclosure. FIG. 10 is explained in conjunction with elements from FIGS. 1, 2, 3, 4A, 4B, 5, 6A, 6B, 6C, 7, 8, and 9. With reference to FIG. 10, there is shown a flowchart 1000. The example method illustrated in the flowchart 1000 may start at 1002 and may be performed by any suitable system, apparatus, or device, such as by the example system 202 of FIG. 2.

At 1002, the formulated second objective function may be submitted in the AML format to a plurality of optimization solver machines that include the optimization solver machine 108 of the annealer system 106. Such a submission to the plurality of optimization solver machines may be performed to assess the quality of solutions generated by the optimization solver machine 108 of the annealer system 106. Also, this may be performed to fine tune operational parameters of the optimization solver machine 108 of the annealer system 106. In one or more embodiments, the processor 204 may be configured to submit the formulated second objective function in the AML format to the plurality of optimization solver machines that include the optimization solver machine 108 of the annealer system 106. The AML format be modified prior to submission so that the modified AML format remains compatible for a target optimization solver machine of the plurality of optimization solver machines.

Other than the optimization solver machine 108, the plurality of optimization solver machines may also include other external optimization solving machines which may include hardware (e.g., generalized quantum computing device or quantum annealing computer) and/or software code that may be different from that of the optimization solver machine 108. This difference may further help to benchmark and improve the performance of the optimization solver machine 108. Also, each of the other external optimization solving machines may correspond to a type of optimization solver machine which uses software solvers, for example, such as Gurobi solver or open source software solvers, such as Solving Constraint Integer Programs (SCIP) solver, Google OR-tool, GNU Linear Programming Kit (GLPK) solver.

At 1004, a call may be provided to the plurality of optimization solver machines to generate a plurality of solutions for the submitted second objective function. Each optimization solver machine may be configured to generate a corresponding solution (i.e. optimal solution) from the discrete solution space by recursively moving towards a global minimum of the submitted second objective function. Each optimization solver machine may be configured to apply suitable optimization methods to generate the corresponding solution. For example, the optimization solver machine 108 of the annealer system 106 may be configured to apply quantum annealing methods to generate the corresponding solution for the submitted second objective function.

At 1006, a performance measure may be determined for each optimization solver machine of the plurality of optimization solver machines by application of a heuristic function on the generated plurality of solutions. In one or more embodiments, the processor 204 may be configured to determine the performance measure for each optimization solver machine of the plurality of optimization solver machines by application of the heuristic function on the generated plurality of solutions. For each optimization solver machine, the performance measure may be indicative of a deviation of a corresponding solution from a ground truth solution, which may be pre-estimated for reference.

The heuristic function may be applied to compare a performance of the optimization solver machine 108 with the other external optimization solver machines. Examples of the heuristic function may include, but is not limited to, a greedy function, and Linear Programming (LP) relaxations (i.e. to solve Integer Linear Programming (ILP) problems and ignore integer constraints by Simplex method).

In some embodiments, a quality assurance check may be further implemented. In the quality assurance check, a ground truth solution or a precise solution for the specific optimization problem may be pre-estimated and stored in the memory 206 and/or the persistent data storage 208 of the example system 202. Each solution from a corresponding optimization solver machine of the plurality of optimization solver machine may be compared with the ground truth solution to determine a deviation of respective solution from the ground truth solution and a corresponding performance measure. Some examples of methods that may be applied to pre-estimate the ground truth solution may include, but are not limited to, branch-and-bound methods, Dynamic Programming (DP) methods, and column generation methods.

At 1008, a solution may be outputted via the display screen of the display device 212. The solution may be generated by a corresponding optimization solver machine for which the determined performance measure is maximum. In one or more embodiments, the processor 204 may be configured to output, via the display screen, the one or more solutions generated by the corresponding optimization solver machine for which the determined performance measure is maximum. In some other embodiments, the operational parameters (e.g. temperature parameters, number of iterations, or runs) of the optimization solver machine 108 may be fine-tuned such that the determined performance measure is maximum for the optimization solver machine 108.

Although the flowchart 1000 is illustrated as discrete operations, such as 1002, 1004, 1006, and 1008; however, in certain embodiments, such discrete operations may be further divided into additional operations, combined into fewer operations, or eliminated, depending on the particular implementation without detracting from the essence of the disclosed embodiments.

Figure 11:
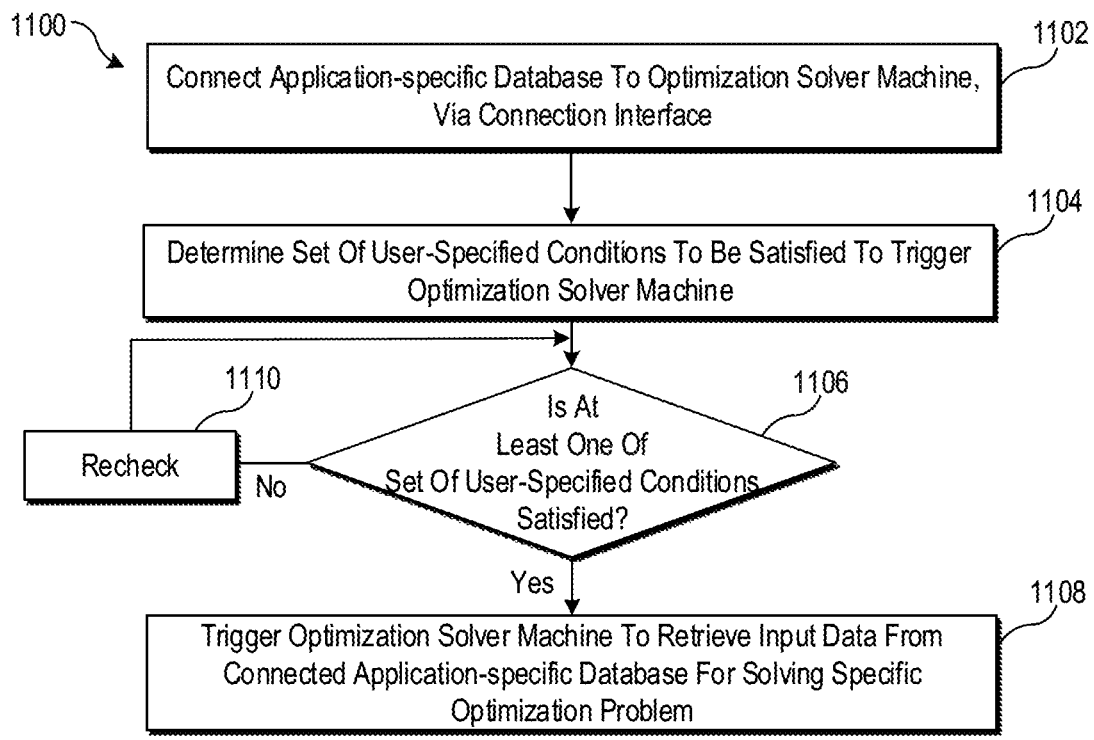
FIG. 11 is a flowchart of an example method of automating triggering of an optimization solver machine to use a connected-database for solving a specific optimization problem.

FIG. 11 is a flowchart of an example method of automating triggering of an optimization solver machine 108 to use a connected-database for solving a specific optimization problem, arranged in accordance with at least one embodiment described in the present disclosure. FIG. 11 is explained in conjunction with elements from FIGS. 1, 2, 3, 4A, 4B, 5, 6A, 6B, 6C, 7, 8, 9, and 10. With reference to FIG. 11, there is shown a flowchart 1100. The example method illustrated in the flowchart 1100 may start at 1102 and may be performed by any suitable system, apparatus, or device, such as by the example system 202 of FIG. 2.

At 1102, the application-specific database 110 may be connected to the optimization solver machine 108, via a connection interface. The application-specific database 110 may include the input data mapped to the plurality of parameters for the specific optimization problem. In one or more embodiments, the processor 204 may be configured to receive a user request to connect the application-specific database 110 to the optimization solver machine 108 once the optimization problem is specified by the user 114, via the electronic user interface 104. The processor 204 may be configured to submit the user request to the optimization solver machine 108. The user request may include information associated with the application-specific database 110. The optimization solver machine 108 may be configured to connect with the application-specific database 110 based on the user request.

At 1104, a set of user-specified conditions to be satisfied may be determined to trigger the optimization solver machine 108. The set of user-specified conditions may be used to trigger the optimization solver machine 108 to again generate one or more solutions to the specific optimization problem. The set of user-specified conditions may include, but are not limited to, a manual trigger input from the user 114, a periodical/non-periodical change in values of one or more parameters of the specific optimization problem, and a logical condition among values of specific parameters of the specific optimization problem. In one or more embodiments, the processor 204 may be configured to determine the set of user-specified conditions to be satisfied to trigger the optimization solver machine 108.

At 1106, it may be determined whether at least one of the determined set of user-specified conditions is satisfied. In one or more embodiments, the processor 204 may be configured to determine whether at least one of the determined set of user-specified conditions is satisfied. In case at least one of the determined set of user-specified conditions is satisfied, control may pass to 1108. Otherwise control may pass to 1110.

At 1108, the optimization solver machine 108 may be triggered to retrieve the input data from the connected application-specific database 110 for solving the specific optimization problem based on the determination that the set of user-specified conditions are satisfied. In one or more embodiments, the processor 204 may be configured to trigger the optimization solver machine 108 to retrieve the input data from the connected application-specific database 110 for solving the specific optimization problem based on the determination that the set of user-specified conditions are satisfied. For example, in case the number of containers change for the container loading problem, a new problem instance may be generated and the optimization solver machine 108 may be triggered to again generate a solution for the container loading problem (also discussed in FIGS. 4A and 4B).

As an example, in many cases, values for different parameters of the plurality of parameters for the specific optimization problem may change. As the values change, solutions for the specific optimization problem may also need to be generated again. In case the change in the values are committed to the application-specific database 110, the processor 204 may be configured to trigger the optimization solver machine 108 to generate another solution for the specific optimization problem.

At 1110, a recheck may be performed to determine whether at least one of the determined set of user-specified conditions is satisfied. The recheck may be performed iteratively till at least one of the determined set of user-specified conditions is satisfied. In one or more embodiments, the processor 204 may be configured to perform the recheck to determine whether at least one of the determined set of user-specified conditions is satisfied.

Although the flowchart 1100 is illustrated as discrete operations, such as 1102, 1104, 1106, 1108, and 1110; however, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as the example system 202) to perform operations. The operations may include displaying an electronic user interface (such as the electronic user interface 104) that comprises a plurality of user-selectable options corresponding to taxonomy information for a plurality of optimization problems. The operations may further include receiving a first user input selecting a first template for a specific optimization problem of the plurality of optimization problems. The first user input may include a selection of at least one user-selectable option of the plurality of user-selectable options. The operations may further include receiving a second user input via the selected first template for the specific optimization problem. The second user input may include input data for a plurality of parameters of the specific optimization problem, as specified in the selected first template. The operation may further include providing a call to an optimization solver machine (such as the optimization solver machine 108) to generate a solution for the specific optimization problem based on the received second user input.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   displaying an electronic user interface that comprises a plurality of user-selectable options corresponding to taxonomy information for a plurality of optimization problems;
   receiving a first user input selecting a first template for a specific optimization problem of the plurality of optimization problems,
      wherein the first user input comprises a selection of at least one user-selectable option of the plurality of user-selectable options;
   receiving a second user input via the selected first template for the specific optimization problem,
      wherein the second user input comprises input data for a plurality of parameters of the specific optimization problem, specified in the selected first template;
   providing a call to an optimization solver machine to generate a solution to the specific optimization problem based on the received second user input; and
   constructing at least one non-deterministic polynomial-time (NP) formulation for an NP problem corresponding to the specific optimization problem, based on the received second user input,
      wherein the construction of the at least one NP formulation corresponds to a mapping of the plurality of parameters of the specific optimization problem to a plurality of attributes of the NP problem.

2. The method according to claim 1, wherein each optimization problem of the plurality of optimization problem corresponds to a combinatorial optimization problem, and
   wherein the specific optimization problem corresponds to an NP problem of a plurality of NP problems.

3. The method according to claim 2, wherein the NP problem is one of a graph coloring problem, a clique problem, an independent set problem, a clique cover problem, a minimax matching problem, a Knapsack problem, a sub-set sum problem, a bin packing problem, a cutting stock problem, a number partition problem, a Hamiltonian cycle problem, a travelling salesman problem, a direct feedback set problem, a vehicle routing problem, a job shop scheduling problem, a generalized assignment problem, a quadratic assignment problem, a set packing problem, a set partition problem, a set covering problem, or a K-Plex problem.

4. The method according to claim 1, wherein the taxonomy information comprises one or more of application-specific domains, domain-specific applications, sub-problems for the domain-specific applications, and a non-deterministic polynomial-time (NP) problem.

5. The method according to claim 1, further comprising:
   retrieving first information associated with a plurality of application-specific domains associated with optimization problems;
   classifying the plurality of application-specific domains into a set of categories based on the retrieved first information;
   determining a set of domain-specific applications for each category of the set of categories;
   determining a set of sub-problems for each domain-specific application of the determined set of domain-specific applications;

mapping, for each domain-specific application of the determined set of domain-specific applications, a set of NP problem types to the determined set of sub-problems; and generating a knowledge graph for a plurality of NP problems associated with the mapped set of NP problem types, wherein the knowledge graph corresponds to a data structure that defines a relationship among different NP problems of the plurality of NP problems.

6. The method according to claim 5, further comprising:
generating a plurality of templates for the corresponding plurality of optimization problems, based on the generated knowledge graph for the plurality of NP problems associated with the mapped set of NP problem types,
wherein each template of the plurality of templates comprises a plurality of input fields for the plurality of parameters of a corresponding optimization problem, and
wherein the plurality of parameters for the plurality of input fields comprises information associated with at least a set of application-specific constraints, a set of variables for the corresponding optimization problem, and an objective function for the corresponding optimization problem.

7. The method according to claim 6, wherein the received first user input corresponds to a selection of the first template from the generated plurality of templates.

8. The method according to claim 1, wherein the constructing further comprises:
evaluating a plurality of NP formulations for the specific optimization problem based on a knowledge graph for a plurality of NP problems and the received second user input; and
selecting at least one NP formulation from the evaluated plurality of NP formulations for the specific optimization problem, based on a number of constraints specified in each NP formulation of the evaluated plurality of NP formulations,
wherein the selected at least one NP formulation corresponds to the constructed at least one NP formulation for the specific optimization problem.

9. The method according to claim 1, further comprising:
formulating a first objective function for the specific optimization problem, based on the constructed at least one NP formulation,
wherein the first objective function comprises a relationship among the plurality of attributes of the NP problem.

10. The method according to claim 9, wherein the first objective function is one of a Quadratic Unconstrained Binary Optimization (QUBO) function, a first Quadratic Binary Optimization function with a set of equality constraints, a second Quadratic Binary Optimization function with a set of inequality constraints, or a Mixed Linear Integer Programming (MILP) function.

11. The method according to claim 9, wherein the formulating further comprises:
retrieving a first mapping table that comprises a list of NP problems mapped to a corresponding list of objective functions;
evaluating a plurality of first objective functions for the NP problem corresponding to the specific optimization problem, based on the retrieved first mapping table; and
selecting the first objective function as an optimal objective function from the evaluated plurality of first objective functions, based on a number of attributes specified for each objective function of the evaluated plurality of first objective functions.

12. The method according to claim 9, further comprising formulating a second objective function that is compatible for execution by the optimization solver machine, based on the formulated first objective function,
wherein the formulated second objective function comprises a relationship between a vector of binary decision variables and a Q-matrix corresponding to the formulated first objective function.

13. The method according to claim 12, further comprising:
identifying a constraint type used in the formulated first objective function, wherein the constraint type is one of an inequality constraint type or an equality constraint type in the formulated first objective function; and
appending a penalty term to the formulated first objective function based on a determination that the determined constraint type used in the formulated first objective function is one of the equality constraint type or the inequality constraint type,
wherein the penalty term is specified in a second mapping table that comprises a list of penalty terms mapped to a corresponding list of constraint types applicable for the formulated first objective function.

14. The method according to claim 12, further comprising:
submitting the formulated second objective function in an Algebraic Modelling Language (AML) format to the optimization solver machine pre-specified for the specific optimization problem; and
providing the call to the optimization solver machine to generate the solution for the specific optimization problem by solving the submitted second objective function.

15. The method according to claim 12, further comprising:
submitting the formulated second objective function in an AML format to a plurality of optimization solver machines that comprises the optimization solver machine;
providing the call to the plurality of optimization solver machines to generate a plurality of solutions for the submitted second objective function; and
determining a performance measure for each optimization solver machine of the plurality of optimization solver machines by application of a heuristic function on the generated plurality of solutions; and
outputting, via a display screen, the solution generated by a corresponding optimization solver machine for which the determined performance measure is maximum.

16. The method according to claim 1, further comprising:
connecting an application-specific database to the optimization solver machine, via a connection interface, wherein the application-specific database comprises the input data mapped to the plurality of parameters for the specific optimization problem;
determining a set of user-specified conditions to be satisfied to trigger the optimization solver machine; and
triggering the optimization solver machine to retrieve the input data from the connected application-specific database for solving the specific optimization problem based on the determination that the set of user-specified conditions are satisfied.

17. The method according to claim 1, wherein the optimization solver machine corresponds to a digital quantum-computing processor for solving the specific optimization problem.

18. One or more non-transitory computer-readable storage media configured to store instructions that, in response to being executed, cause a system to perform operations, the operations comprising:
- displaying an electronic user interface that comprise a plurality of user-selectable options corresponding to taxonomy information for a plurality of optimization problems;
- receiving a first user input selecting a first template for a specific optimization problem of the plurality of optimization problems,
  - wherein the first user input comprises a selection of at least one user-selectable option of the plurality of user-selectable options;
- receiving a second user input via the selected first template for the specific optimization problem,
  - wherein the second user input comprises input data for a plurality of parameters of the specific optimization problem, as specified in the selected first template;
- providing a call to an optimization solver machine to generate a solution to the specific optimization problem based on the received second user input; and
- constructing at least one non-deterministic polynomial-time (NP) formulation for an NP problem corresponding to the specific optimization problem, based on the received second user input,
  - wherein the construction of the at least one NP formulation corresponds to a mapping of the plurality of parameters of the specific optimization problem to a plurality of attributes of the NP problem.

19. A system, comprising:
- a processor configured to:
  - display an electronic user interface that comprises a plurality of user-selectable options corresponding to taxonomy information for a plurality of optimization problems;
  - receive a first user input selecting a first template for a specific optimization problem of the plurality of optimization problems,
    - wherein the first user input comprises a selection of at least one user-selectable option of the plurality of user-selectable options; and
  - receive a second user input via the selected first template for the specific optimization problem,
    - wherein the second user input comprises input data for a plurality of parameters of the specific optimization problem, as specified in the selected first template,
  - construct at least one non-deterministic polynomial-time (NP) formulation for an NP problem corresponding to the specific optimization problem, based on the received second user input,
    - wherein the construction of the at least one NP formulation corresponds to a mapping of the plurality of parameters of the specific optimization problem to a plurality of attributes of the NP problem; and
- an optimization solver machine communicatively coupled to the processor, the optimization solver machine is configured to generate a solution for the specific optimization problem, based on the received second user input.

* * * * *